United States Patent
Kobayashi

(10) Patent No.: US 7,880,789 B2
(45) Date of Patent: Feb. 1, 2011

(54) SOLID-STATE IMAGE PICK-UP APPARATUS CAPABLE OF REMARKABLY REDUCING DARK CURRENT AND A DRIVE METHOD THEREFOR

(75) Inventor: Hirokazu Kobayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 833 days.

(21) Appl. No.: 11/723,676

(22) Filed: Mar. 21, 2007

(65) Prior Publication Data

US 2007/0222882 A1 Sep. 27, 2007

(30) Foreign Application Priority Data

Mar. 23, 2006 (JP) .............................. 2006-081022
Dec. 28, 2006 (JP) .............................. 2006-355815

(51) Int. Cl.
*H04N 5/335* (2006.01)
(52) U.S. Cl. ...................................... 348/311; 348/243
(58) Field of Classification Search ................ 348/272, 348/340, 246, 247, 350, 241, 311, 305, 322, 348/243
See application file for complete search history.

(56) References Cited

U.S. PATENT DOCUMENTS

| | | | |
|---|---|---|---|
| 5,900,769 A | 5/1999 | Tanabe | |
| 5,990,952 A * | 11/1999 | Hamasaki | 348/311 |
| 6,356,305 B1 * | 3/2002 | Akagawa | 348/311 |
| 6,583,818 B1 * | 6/2003 | Toma | 348/312 |
| 7,057,657 B1 * | 6/2006 | Ishihara et al. | 348/312 |
| 2003/0086005 A1 * | 5/2003 | Nakamura | 348/223.1 |
| 2004/0051792 A1 * | 3/2004 | Oda et al. | 348/229.1 |
| 2006/0033829 A1 * | 2/2006 | Ikeda et al. | 348/311 |
| 2006/0092283 A1 * | 5/2006 | Tanizoe et al. | 348/207.99 |

FOREIGN PATENT DOCUMENTS

| | | |
|---|---|---|
| JP | 8-2796089 A | 10/1996 |
| JP | 2005-286470 A | 10/2005 |

* cited by examiner

*Primary Examiner*—Jason Chan
*Assistant Examiner*—Yih-Sien Kao
(74) *Attorney, Agent, or Firm*—Birch, Stewart, Kolasch & Birch, LLP

(57) ABSTRACT

A solid-state image pick-up device is configured for more effectively reducing dark current of an interlace scanning type of CCD so that electrodes connected to transfer shift gates are sequentially arranged on two adjacent vertical transfer paths and are driven such that signal charges are prevented from staying longer in the vertical transfer path below the electrodes connected to the transfer shift gates. This prevents signal charges from waiting longer for vertical transfer during a horizontal transfer period, thereby reducing dark current otherwise caused in the vertical transfer paths.

8 Claims, 17 Drawing Sheets

SOLID-STATE IMAGE PICK-UP APPARATUS CAPABLE OF REMARKABLY REDUCING DARK CURRENT AND A DRIVE METHOD THEREFOR

BACKGROUND OF THE INVENTION

1. Field of the Invention

The present invention relates to a solid-state image pick-up apparatus and a drive method therefor, and more particularly to such an apparatus and a method for producing an image signal with dark current minimized.

2. Description of the Background Art

An image capturing apparatus having a solid-state image pick-up device is required to produce an image signal whose quality is as high as possible on its output. When influence of a noise component due to dark current included in an image signal increases, signal to noise ratio is deteriorated. In order to address this problem, some methods as disclosed by U.S. Pat. No. 5,900,769 to Tanabe and Japanese Patent Laid-Open Publication No. 279608/1996 have been proposed. Tanabe and Japanese '608 publication both disclose a method for reducing dark current of an FIT (Frame Interline Transfer) type of charge-coupled device (CCD).

More specifically, Tanabe discloses technology which has signal charges wait under the effect of a surface potential similar to the pinning effect of photosensitive cells in a horizontal scanning period so that no dark current is produced. Further, Japanese '608 publication discloses technology in which a transfer path is composed of a two-phase clock driven type of CCD device having its vertical transfer electrode applied with a negative voltage during a horizontal scanning period so that the surface potential of the well is "pinned" to the storage level of the charge packet.

Note that dark current is primarily generated on vertical transfer paths composed of CCD devices. In accordance with the technology disclosed by Tanabe and Japanese '608 publication, the electric charge storage portions, such as vertical transfer paths, in which signal charges stay for a longer period of time, should be pinned rather than others. However, since the vertical transfer paths are of an IT (Interline Transfer) type of CCD devices, which are different in CCD structure from the photosensitive cells, the methods for reduction of dark current disclosed by both publications are not applicable to the vertical transfer paths.

The interline transfer type of CCD is different from the storage portions which are of a frame interline transfer type of CCD. Typically, the IT type of CCD has electrodes connected to transfer shift gates for reading out signal charges accumulated in photosensitive cells to a vertical transfer path, i.e., electrodes having transfer gates connected, and electrodes without transfer gates, and both types of electrodes are alternately arranged, and are driven in a four-phase or eight-phase driving fashion, for example.

Another Japanese Patent Laid-Open Publication No. 2005-286470 discloses a method for reducing dark current by reducing the capacity of potential wells formed not only in FIT type of CCDs but also vertical transfer paths. Reduction of the capacity of potential wells is usually associated with the reduction of the area of the potential wells formed in the vertical transfer paths.

The studies to detect the predominant causes of dark current generated in the vertical transfer paths was conducted, and show that dark current increases when signal charges stay longer below the electrodes having the transfer gates connected. This implies that the method, disclosed in Japanese '470 publication, for reducing the capacity of potential wells formed in vertical transfer paths does not provide a way to effectively reduce dark current.

SUMMARY OF THE INVENTION

It is an object of the present invention to provide a solid-state image pick-up apparatus and a drive method for more effectively reducing dark current of an IT type of CCDs than the prior art.

The invention provides a solid-state image pick-up device comprising: a plurality of photosensitive cells two-dimensionally arranged for converting incident light from an object scene into signal charges; vertical transfer paths disposed adjacent each of the plurality of photosensitive cells and having electrodes vertically arranged for transferring the signal charges; a plurality of gates formed between each of the plurality of photosensitive cells and the vertical transfer path in connection with the electrodes of the vertical transfer path for reading out the signal charges accumulated in the plurality of photosensitive cells to the vertical transfer path; and a horizontal transfer path having electrodes for transferring the signal charges in a horizontal direction substantially perpendicular to the vertical transfer paths, the device and the electrodes of the vertical transfer paths being sequentially arranged on two adjacent vertical transfer paths.

The solid-state image pick-up device of the invention is configured so that the electrodes connected to the gates are sequentially arranged on two adjacent vertical transfer paths, and thus signal charges are prevented from staying for a longer period of time in the vertical transfer path below the electrodes connected to the gates. Consequently, signal charges are prevented from waiting longer for vertical transfer during a horizontal transfer period.

Further in accordance with the invention, a solid-state image pick-up apparatus comprises a solid-state image pick-up device including: a plurality of photosensitive cells two-dimensionally arranged for converting incident light from an object scene into signal charges; vertical transfer paths disposed adjacent each of the plurality of photosensitive cells and having electrodes vertically arranged for transferring the signal charges; a plurality of gates formed between each of the plurality of photosensitive cells and the vertical transfer path in connection with the electrodes of the vertical transfer path for reading out the signal charges accumulated in the plurality of photosensitive cells to the vertical transfer path; and a horizontal transfer path having electrodes for transferring the signal charges in a horizontal direction substantially perpendicular to the vertical transfer paths; a timing signal generator for generating a timing signal supplied to the gates for reading out signal charges accumulated in the photosensitive cells; and a drive signal generator operative in response to the timing signal supplied for generating a drive signal to be applied to the electrodes of the vertical transfer paths for transferring the signal charges, the gates and the electrodes of the gates being alternately arranged on two adjacent vertical transfer paths, the drive signal generator generating a drive signal for preventing the signal charges from staying longer in the vertical transfer path under the electrodes in connection with the gates, the apparatus further comprising a controller for controlling the drive signal generator based on an image pick-up condition obtained form the incident light.

The solid-state image pick-up apparatus of the invention comprises a solid-state image pick-up device configured so that the electrodes connected to the gates are alternately arranged on two adjacent vertical transfer paths, instructs a controller to control generation of the drive signal based on the image pick-up condition obtained from the incident light, and instructs a drive signal generator to generate a drive signal for preventing the signal charges from staying longer in the vertical transfer path under the electrodes connected to the gates. In this way, based on the result of comparison between a predetermined threshold value and information on image pick-up conditions, the signal charges are prevented from staying longer in the vertical transfer path under the electrodes connected to the gates and consequently, signal charges are prevented from waiting for a long period of time for vertical transfer during a horizontal transfer period.

Further in accordance with the present invention, also provided is a drive method for use in an solid-state image pick-up apparatus comprising a plurality of photosensitive cells two-dimensionally arranged for converting light from an object scene into signal charges, the signal charges stored in each of the plurality of photosensitive cells being read out from the sell, sequentially transferred in vertical and horizontal directions to be converted into an electric signal to be output, the method including: a first step of controlling generation of a timing signal based on an image pick-up condition obtained from the incident light; a second step of generating a timing signal for reading out the signal charges accumulated in the photosensitive cells; and a third step of generating a first drive signal for reading out the signal charges accumulated in the photosensitive cells and a second drive signal for transferring the signal charges in a vertical direction, the third step generating, based on the image pick-up condition, a third drive signal for preventing the signal charges from waiting for transfer.

The drive method of the invention includes the first step of controlling generation of a timing signal based on the image pick-up condition obtained from the incident light, the second step of generating a timing signal for reading out the signal charges accumulated in the photosensitive cells, and the third step of generating the first and second drive signals. Particularly, the third step generates, based on the image pick-up condition, the third drive signal for preventing the signal charges from staying longer in the vertical transfer path. It is therefore possible to reduce dark current generated in the transfer paths to which the signal charges are read out from the photosensitive cells and suppress deterioration of the quality of image.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Figure 1:
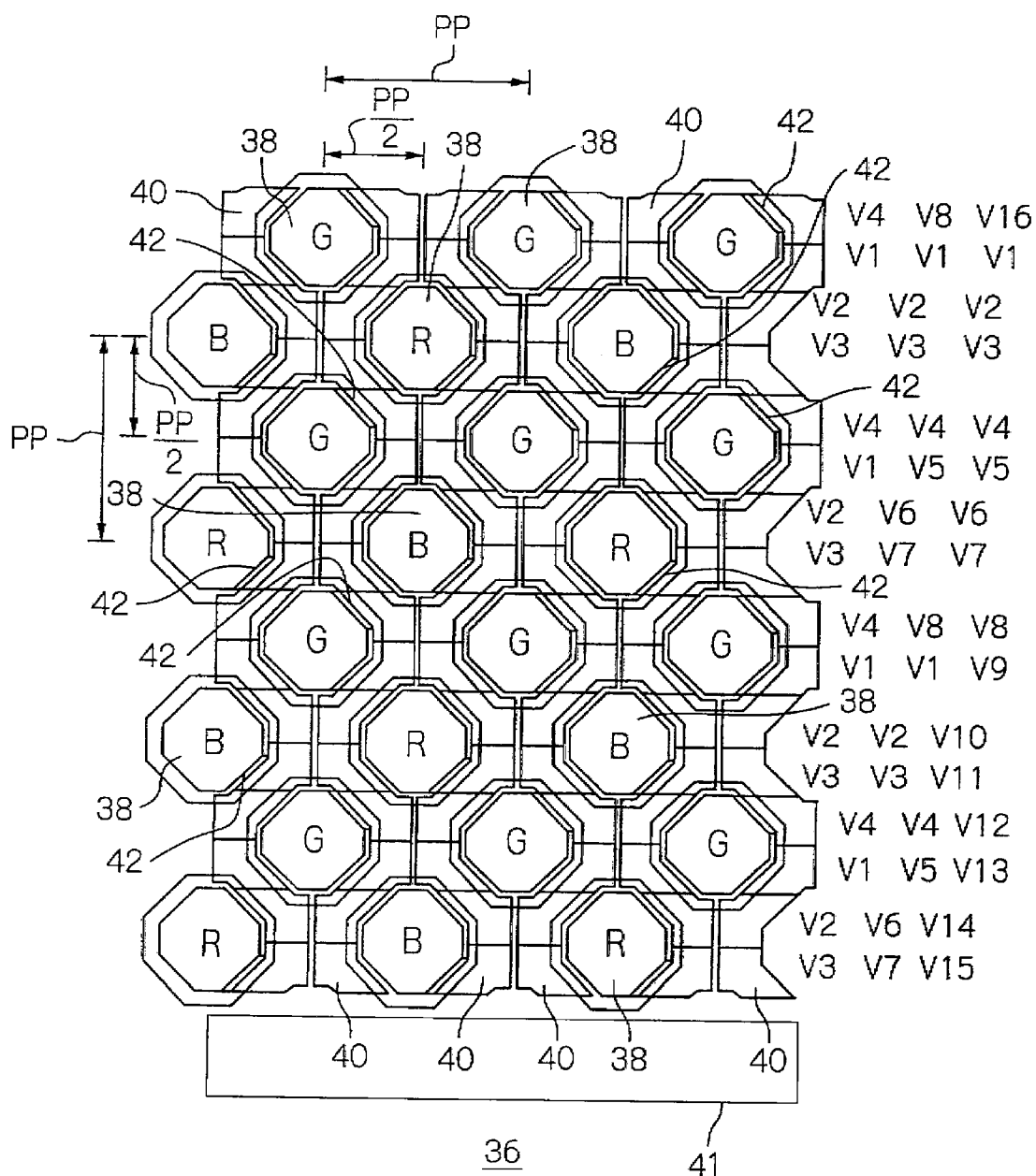
FIG. 1 schematically shows a configuration of an embodiment of a solid-state image pick-up device according to the invention.

Embodiments of a solid-state image pick-up device according to the invention will be described in detail below with reference to the accompanying drawings. Referring to FIG. 1, in the embodiment of a solid-state image pick-up device according to the invention, electrodes V3 and V4 connected to transfer shift gates 42 are sequentially arranged on two adjacent vertical transfer paths 40 which are formed at successive positions, thereby resultantly preventing signals charges from waiting for vertical transfer, i.e., staying for a longer period of time in a vertical transfer path 40 under the electrodes V3 and V4 of the transfer shift gate 42 during a horizontal transfer period.

The illustrative is directed to an application where a solid-state image pick-up device of the invention is applied to a digital camera 10. Parts or elements not directly pertinent to understanding the invention are omitted from the drawings and description.

Figure 2:
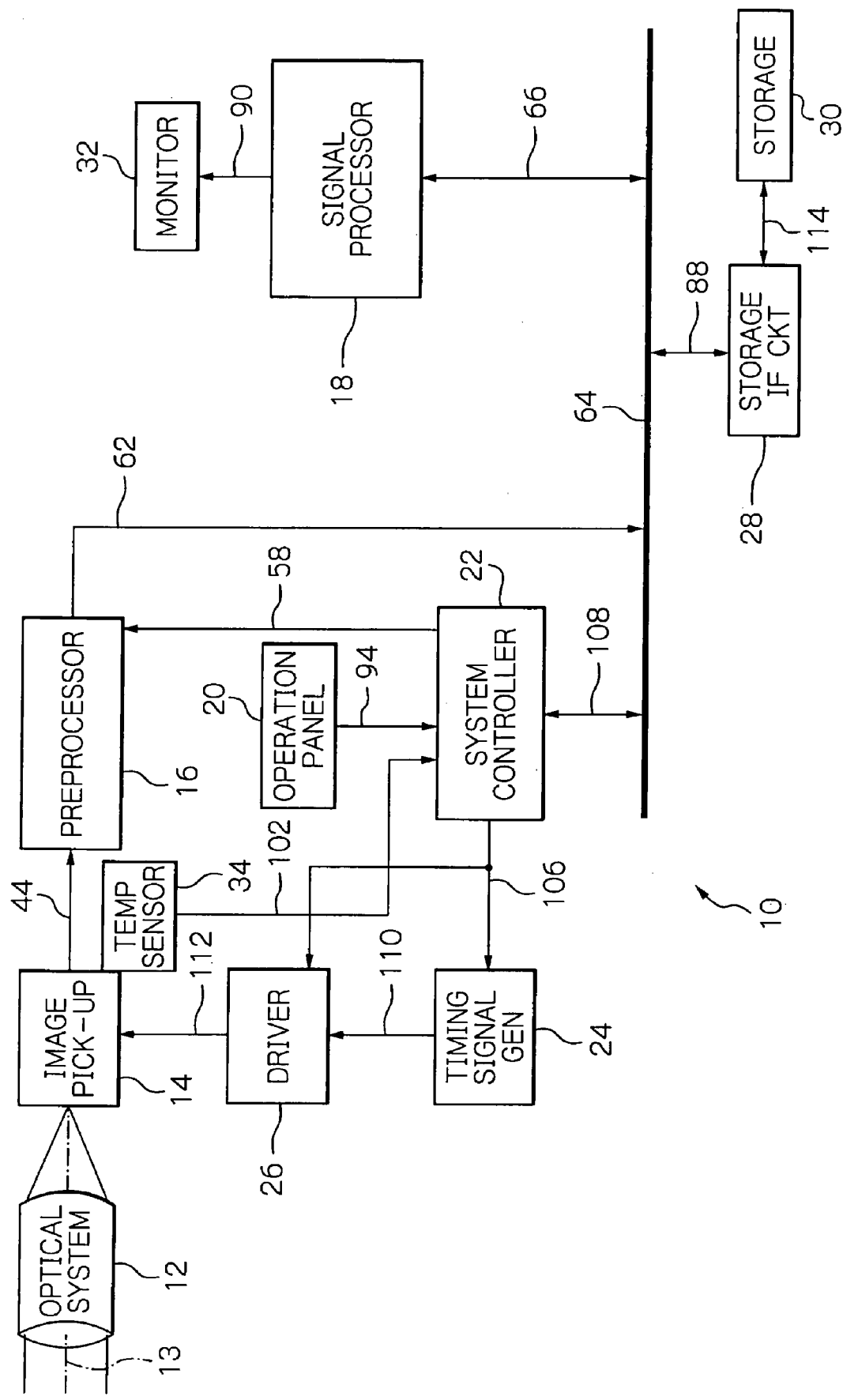
FIG. 2 is a schematic block diagram showing a configuration of an embodiment of a digital camera comprising the solid-state image pick-up device shown in FIG. 1.

As shown in FIG. 2, the digital camera 10 comprises an optical system 12, an image pick-up unit 14, a preprocessor 16, a signal processor 18, an operation panel 20, a system controller 22, a timing signal generator 24, a driver 26, a storage interface (IF) circuit 28, a storage 30, a monitor display 32, and a temperature sensor 34, which are interconnected as illustrated.

The optical system 12 is responsive to the operation on the operation panel 20 to focus light 13 incident thereon from an object scene to be captured onto an imaging surface or photosensitive cell array, described later, of the image pick-up unit 14. The optical system 12 adjusts the angle of view or focal length in response to the operation amount of a zoom switch or the half-stroke depressing of a shutter release button on the operation panel 20, which are not specifically shown in the figure.

The image pick-up unit 14 includes a plurality of color filter segments positioned on the corresponding photosensitive cells so as to receive light 13 incident thereon, and a solid-state image pick-up device 36. In the solid-state image pick-up device 36 in the image pick-up unit 14, the color filter segments filter out different color components of light 13 incident thereon, and the photosensitive cells convert the light 13 incident through the corresponding color filter segments to signal charges having the attribute thereof associated with the respective color filter segments to output the color signals therefrom. As shown in FIG. 1, in the solid-state image pick-up device 36 of the embodiment, color filter segments corresponding to three primary colors red (R), green (G) and blue (B) are arranged in parallel rows in the horizontal direction of an imaging frame. The adjacent rows are offset from each other by one-half of the pitch PP of the segments in each row. Further, in the solid-state image pick-up device 36, the color filter segments are arranged in parallel columns in a vertical direction of the imaging frame. The adjacent columns are offset by one-half of the pitch PP of the segments in each column. The solid-state image pick-up device 36 includes a color filter layer composed of RGB color filter segments in a one-to-one correspondence to the photosensitive cells or photodiodes 38.

The color filter segments of color G are arranged in lattice grid array pattern and the color filter segments of color R and B are arranged in an RB complete checkered pattern. In the solid-state image pick-up device 36 shown in FIG. 1, signal charges generated in the photosensitive cells by exposure to light 13 are read out to vertical transfer paths 40 and sequentially transferred in the vertical direction. After the vertical transfer, the signal charges are transferred to a horizontal transfer path 41. The horizontal transfer path 41 transfers the signal charges to an output amplifier also not illustrated. The output amplifier is a floating diffusion amplifier with the illustrative embodiment for converting the transferred signal charges to a corresponding analog voltage signal to output the signal.

The solid-state image pick-up device 36 will be described in more detail. In the solid-state image pick-up device 36, transfer shift gates 42 are formed near the respective photosensitive cells for reading out the signal charges accumulated in the associated photosensitive cells. The transfer shift gates 42 are formed so that the shift gates are connected to corresponding electrodes just above the associated vertical transfer path 40. In the embodiment, the electrodes connected to the transfer shift gates 42 are not alternately arranged in two successive rows on two adjacent transfer paths, i.e., the photosensitive cells are sequentially arranged on two adjacent vertical transfer paths.

For example, in an application in which the vertical transfer path 40 is driven by four-phase drive signals ΦV1 to ΦV4, the transfer shift gates 42 are connected to vertical transfer electrodes V3 and V4. Further, for example, in an application where the vertical transfer path 40 is driven by eight-phase drive signals ΦV1 to ΦV8 or by sixteen-phase drive signals ΦV1 to ΦV16, the transfer shift gates 42 are connected to vertical transfer electrodes V3 and V4, and V7 and V8, or connected to vertical transfer electrodes V3 and V4, V7 and V8, V11 and V12, and V15 and V16, respectively. When the transfer shift gates 42 are connected in the manners as described above, signal charges are prevented from staying longer in the transfer path below the electrodes V3 and V4 serving also as the transfer shift gate 42 in the case of four-phase drive, or below the electrodes V3 and V4, and V7 and V8 serving also as the transfer shift gate 42 in the case of eight-phase drive. Further, signal charges are prevented from staying longer below the electrodes V3 and V4, V7 and V8, V11 and V12, and V15 and V16 serving also as the transfer shift gate 42 in the case of sixteen-phase drive. As already described, in the solid-state image pick-up device 36, the photosensitive cells 38 corresponding to three primary colors are arranged in parallel rows in a horizontal direction so that adjacent rows are offset by one-half of the pitch of the photosensitive cells in each row and therefore the vertical transfer path (VCCD) 40 is formed so as to detour the photodiodes 38 and as a result, formed in a meandering shape.

Now, in operation, in the solid-state image pick-up device 36 shown in FIG. 1, whole pixel read out is performed on the photosensitive cells 38 through the respective transfer shift gates 42. As already described, the solid-state image pick-up device 36 has its transfer shift gates 42 connected to the vertical transfer electrodes V3 and V4 in the case of four-phase drive, connected to the vertical transfer electrodes V3 and V4, and V7 and V8 in the case of eight-phase drive, and connected to vertical transfer electrodes V3 and V4, V7 and V8, V11 and V12, and V15 and V16 in the case of sixteen-phase drive. In this way of connection, even when the signal charges are read out simultaneously from the adjacent photosensitive cells, the charges are transferred to different vertical transfer paths 40. Thus, the signal charges read out from the photosensitive cells corresponding to different colors are not mixed in color with each other.

The signal charges read out from the photosensitive cells to the vertical transfer paths 40 are sequentially transferred in response to the four-phase, eight-phase, and sixteen-phase drive signals to the horizontal transfer path. In this way, the signal charges read out from all of the photosensitive cells will be transferred in the vertical transfer paths driven in a progressive scan mode. To the array of pixels thus offset with respect to each other, applicable is not only the signal charge transfer in the progressive scan mode but also in an interlace scanning such as a two- or four-field read out mode.

Figure 3:
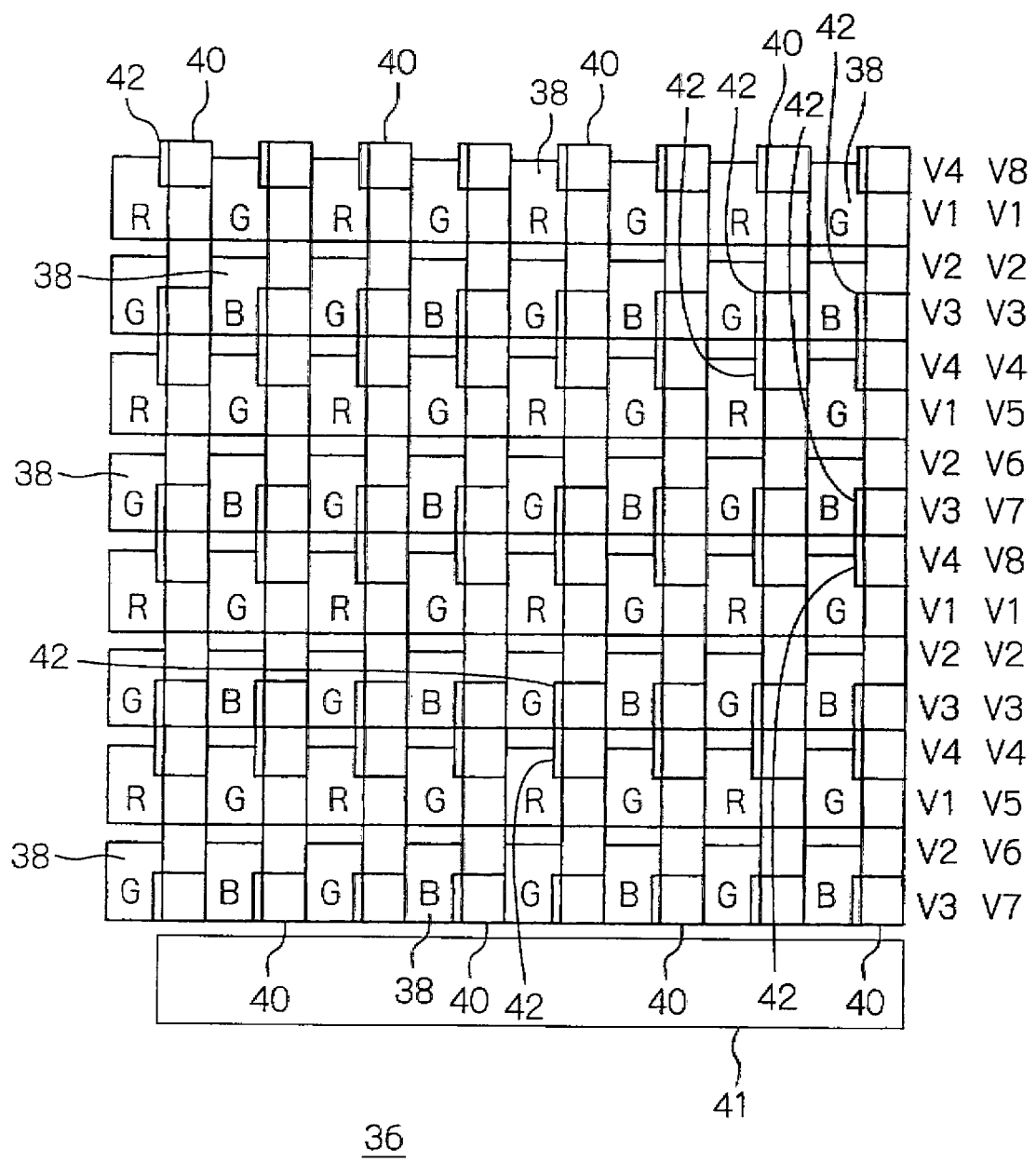
FIG. 3 schematically shows a configuration of an alternative embodiment of the solid-state image pick-up device according to the invention.

Further, the solid-state image pick-up device 36 is not limited to such an array of pixels offset with respect to each other as shown in FIG. 1, but may have the array of Bayer pattern in a square lattice form shown in FIG. 3, that is, may be of the type in which adjacent pixels are not diagonally offset from each other. Also in this case, the transfer shift gates 42 disposed adjacent to each other are connected to vertical transfer electrodes V3 and V4 in the application of four-phase drive, and connected to vertical transfer electrodes V3 and V4, and V7 and V8 in the application of eight-phase drive, in order to allow signal charges to be transferred to the same vertical transfer path 40. However, with the solid-state image pick-up device 36, when having the array of square lattice pattern, in order to prevent signal charges read out through the adjacent transfer shift gates 42 from being mixed in color with each other, signal charges are read out in an interlace fashion with a time difference disposed between two or four fields.

Figure 4A:
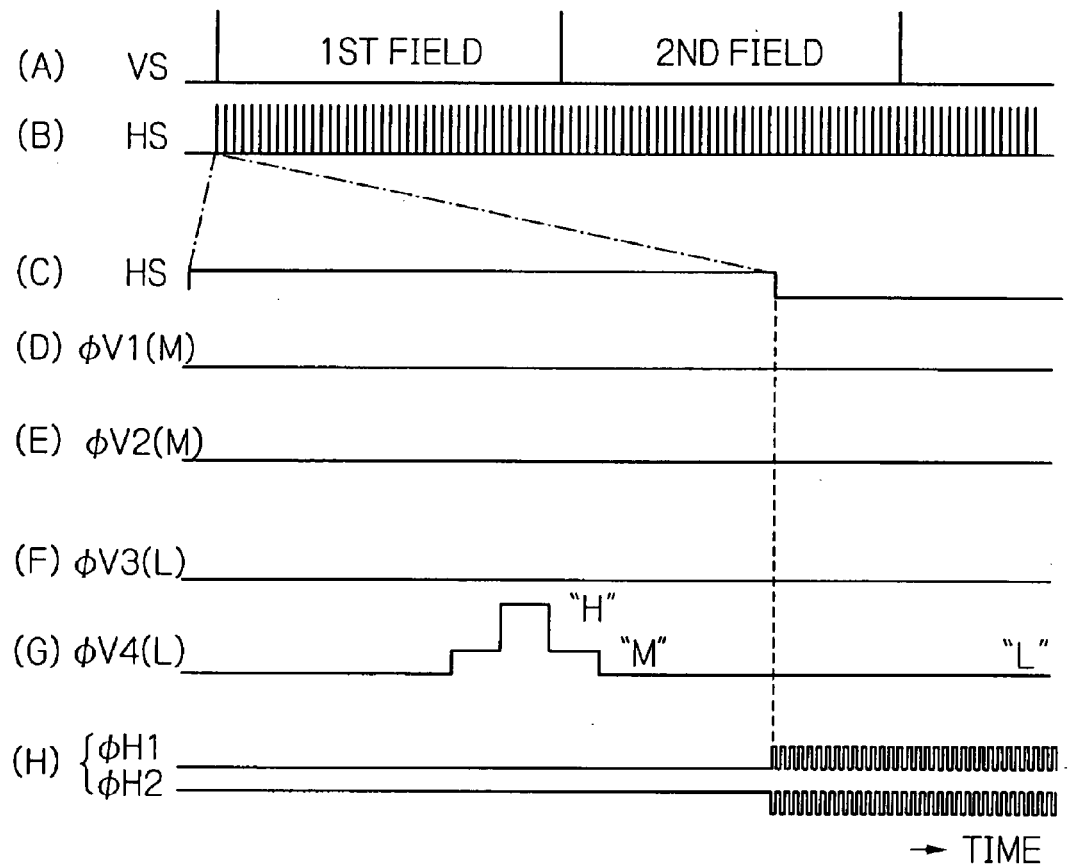
FIGS. 4, 4B and 5 are timing charts useful for understanding operation timing in the solid-state image pick-up device shown in FIG. 3.

For example, the interlace readout mode shown in FIG. 4A is of a two-field interlacing. In response to a vertical synchronous signal VS, signal charges accumulated in photosensitive cells 38 are read out in two fields, i.e., first and second fields. FIG. 4A, line (B), shows that each of those fields includes a predetermined number of horizontal synchronous signals HS. FIG. 4A, line (C), shows a detailed waveform of the horizontal synchronous signal in the first field expanded in the time domain. In the figure, lines (D) to (G) show at which points in time the signal charges stored in the photosensitive cells 38 are read out to the vertical transfer path 40 during a high level "H" period of the horizontal synchronous signal HS. More specifically, during the first field, only the vertical drive signal ΦV4 is at the highest one "H" of its tri-value levels. This causes the signal charges to be read out to the vertical transfer path 40. After the transition of the horizontal synchronous signal HS from its level "H" to "L", horizontal drive signals ΦH1 and ΦH2 with the phase opposite to each other shown in FIG. 4A, line (H), are applied to the horizontal transfer path, not shown.

Figure 4B:
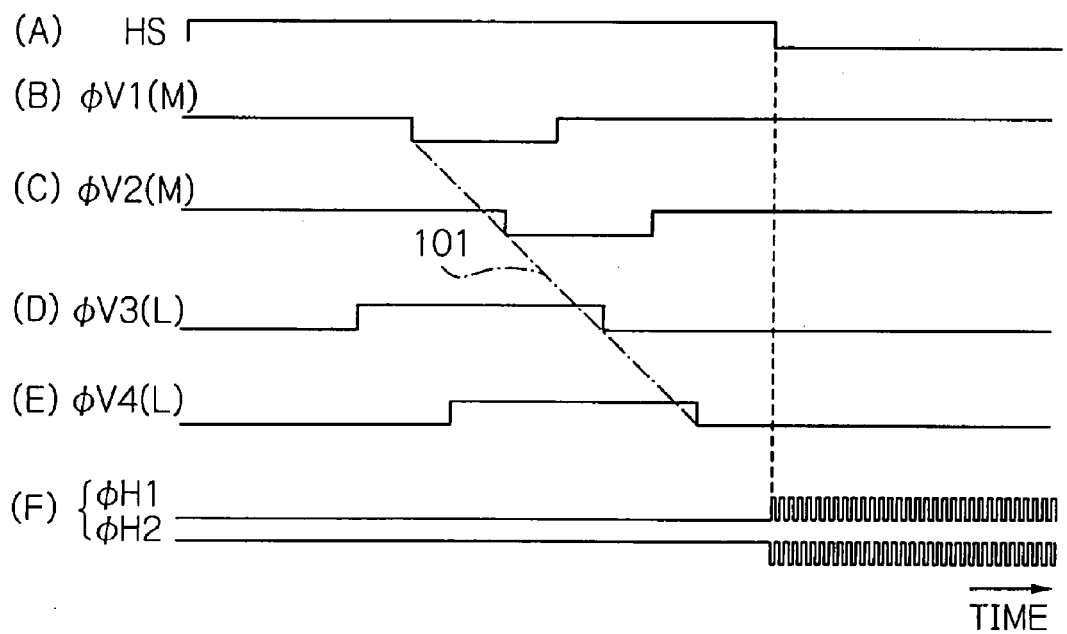

Further, when focusing our attention on the vertical transfer period shown in FIG. 4B, line (A), signal charges read out from the photosensitive cells are confined in a potential well or packet upon application of a vertical drive signal ΦV1 shown in FIG. 4B, line (B). Then, when a vertical drive signal ΦV2 shown in the figure, line (C), is applied, the potential well is shifted so that the signal charges are shifted accordingly. When vertical drive signals ΦV3 and ΦV4 are applied, the potential well developed by these signals moves over time as indicated by a dot-and-dash line 101. In this way, the potential well moves in synchronous with the timing signal changing its level from "M" to "L" as shown in FIG. 4B, lines (B) to (E), so that the signal charges are transferred to the horizontal transfer path, accordingly.

Figure 5:
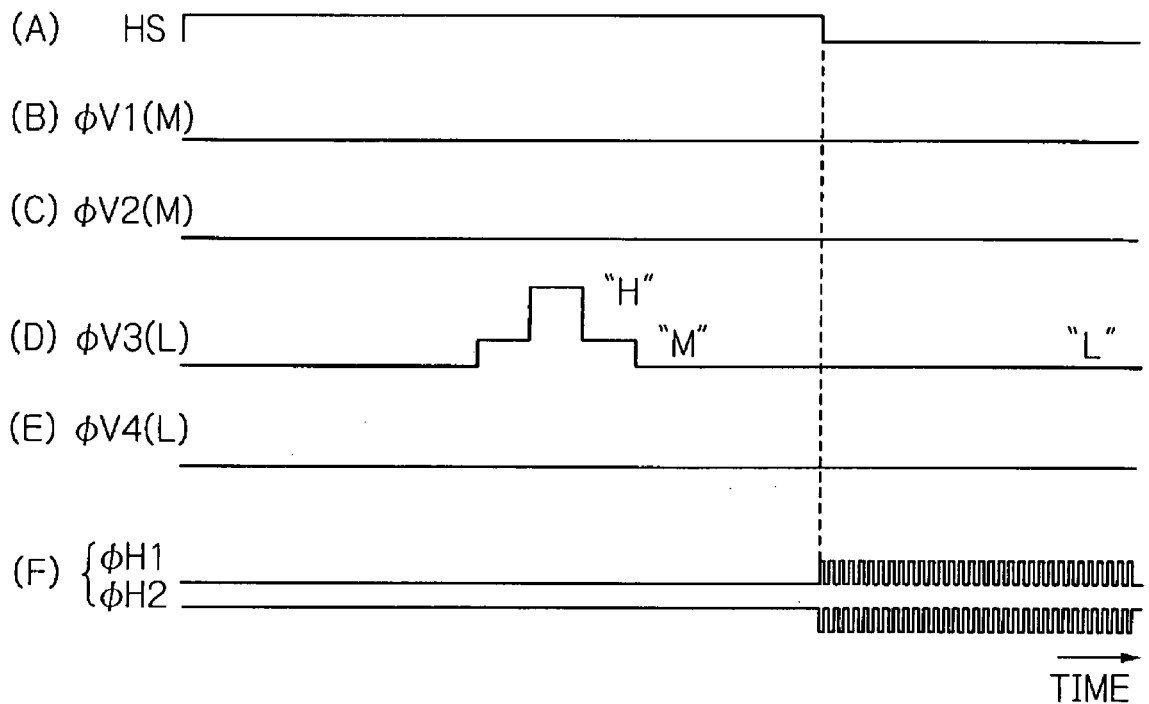

Now, FIG. 5, line (A), shows a detailed waveform of the horizontal synchronous signal in the second field expanded in the time axis. Further, FIG. 5B, lines (B) to (E) show at which points in time the signal charges accumulated in photosensitive cells 38 are read out to the vertical transfer path 40 during the high level "H" period of the horizontal synchronous signal HS upon application of the vertical drive signal ΦV3. More specifically, during the second field, only the vertical drive signal ΦV3 is at the highest one "H" of its tri-value levels. This causes the signal charges accumulated in photosensitive cells 38 to be read out to the vertical transfer path 40. The signal charges are vertically transferred in response to the vertical drive signals ΦV1 to ΦV4 shown in FIG. 4B, lines (D) to (G). After the vertical transfer, the signal charges transferred to the horizontal transfer path are horizontally transferred upon application of horizontal synchronous signals ΦH1 and ΦH2 to the horizontal transfer path.

The electrodes are arranged as described above and the stored signal charges are read out in two fields and transferred to the vertical transfer path 40, and then vertically transferred in the vertical transfer path 40. This enables the signal charges residing in the vertical transfer path 40 under the electrodes not connected to the transfer shift gates 42 to stay therein during the horizontal scanning period.

Figure 6:
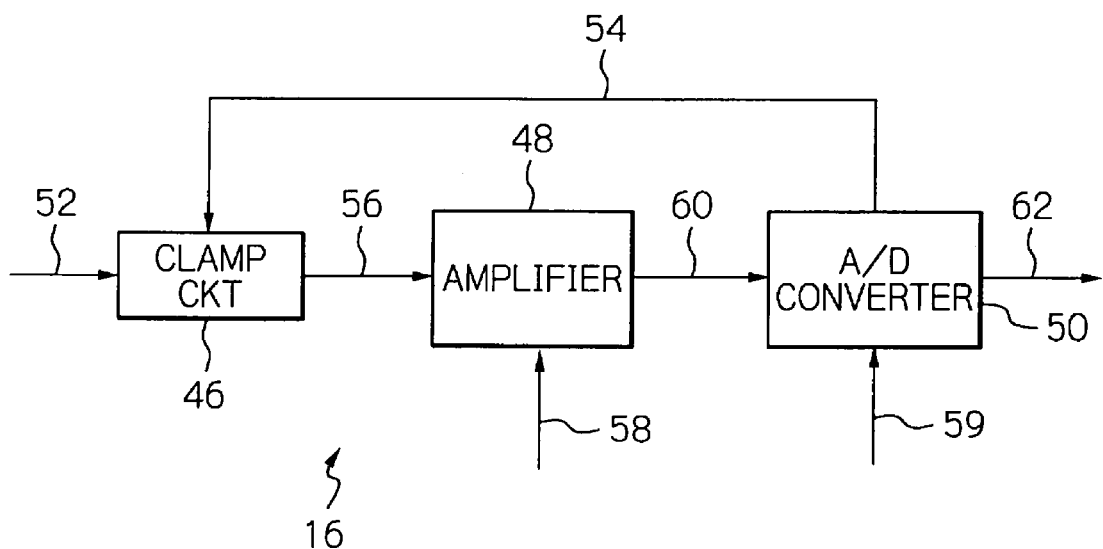
FIG. 6 is a schematic block diagram showing a configuration of a preprocessor of the digital camera shown in FIG. 2.

Referring back to FIG. 2, the image pick-up unit 14 outputs an analog signal 44 from the solid-state image pick-up device 36 to the preprocessor 16. In the following, signals are designated with reference numerals specifying connections on which they appear. The preprocessor 16 includes an analog front end (AFE) function. The AFE function includes, although not specifically shown, the functions of reducing the noise in the analog signal 44 by a correlated double sampling (CDS) as well as clamping the analog signal with the noise reduced, amplifying the signal thus clamped, and digitizing the amplified signal. As shown in FIG. 6, the preprocessor 16 includes a clamp circuit 46, an amplifier 48, and an analog-to-digital (A/D) converter 50, which are interconnected as illustrated.

The clamp circuit 46 receives an analog signal 52 with reduced noise, clamps the analog signal 52 in response to a signal 54 supplied from the A/D converter 50, and outputs the clamped analog signal 56. The amplifier 48 receives the clamped signal 56 and amplifies the signal in response to a control signal 58 supplied from the system controller 22. The amplifier 48 outputs the amplified analog signal 60 to the A/D converter 50. The A/D converter 50 samples the analog signal 60 in time with a timing signal 59 supplied from the timing signal generator 24 and outputs image data 62 in the form of digital signal. Referring back to FIG. 2, the preprocessor 16 supplies the preprocessed image data 62 to the signal processor 18 over the bus 64 and the signal line 66.

Figure 7:
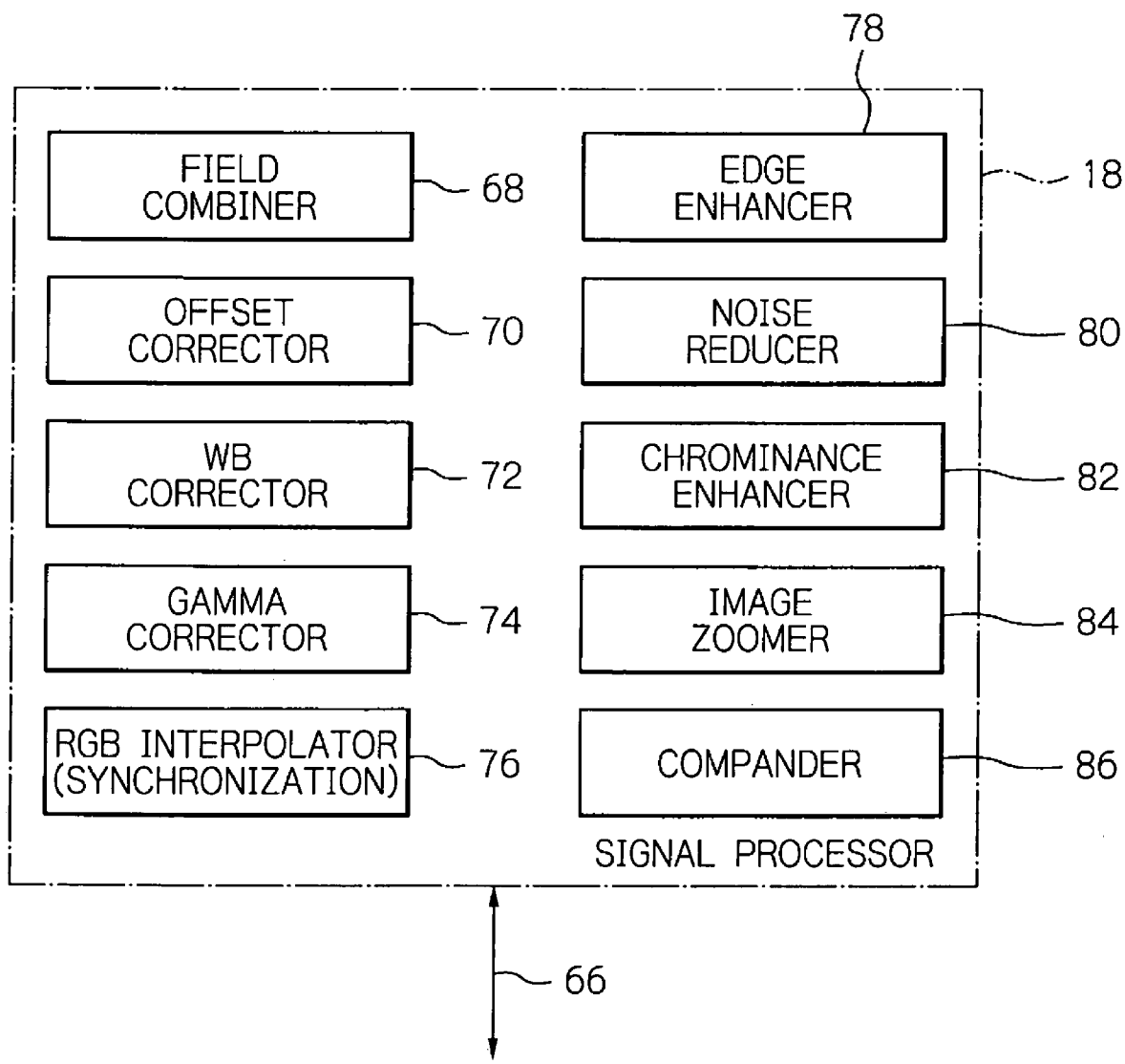
FIG. 7 is a schematic block diagram showing a configuration of a signal processor of the digital camera shown in FIG. 2.

The signal processor 18 serves as processing the supplied image data 62 under the control of the system controller 22. Referring to FIG. 7, the signal processor 18 includes a field combiner 68, an offset corrector 70, a white balance (WB) corrector 72, a gamma corrector 74, an RGB interpolator 76, an edge enhancer 78, a noise reducer 80, a chrominance enhancer 82, an image zoomer 84, and a compander 86. The field combiner 68 functions as rearranging image data read out in two or four fields to combine the image data into one frame of image data. The offset corrector 70 has an offset adjustment function for compensating for the offset with respect to the pedestal level of the combined image data.

The white balance corrector 72 functions as adjusting the white balance of offset-corrected image data to correct the balancing of color components. The gamma corrector 74 functions as correcting the gamma characteristics of the image data thus corrected in white balance in order to insure correct gray scale. The RGB interpolator 76 has a function of using the gradation-corrected image data to interpolate pixel data of the color components which are not obtained when using a single chip of RGB color filter with colors other than those of the color filter segments to be compensated for to produce the pixel data of those colors. Since, for each pixel, pixel data of the three primary colors, red (R), green (G) and blue (B), is simultaneously produced, the interpolation scheme is called "synchronization". Although not shown, the signal processor 18 uses the image data thus synchronized to produce a Y/C (luminance/chrominance) signal.

The edge enhancer 78 is adapted to detect the edge of an image based on the generated Y/C signal and emphasizes the detected edge. The noise reducer 80 functions as reducing noise in the image data with the edge emphasized. The chrominance enhancer 82 functions as emphasizing the chrominance of the image data with the noise reduced. The image zoomer 84 adjusts, in response to the operator's manipulation on the apparatus, the size of an image represented by image data to a predetermined size, in order to allow a liquid crystal display device, not shown, to display the image on its full screen or as a thumbnail. The compander 86 functions as compressing the produced Y/C signal and expanding a compressed signal to restore the original image signal in response to a recording mode selected. Examples of the recording mode include JPEG (Joint Photographic Experts Group) mode, MPEG (Moving Picture Experts Group) mode, and raw data mode, etc.

It is preferable that the supplied image data 62 is processed at least in the order of the field combiner 68, offset corrector 70, white balance corrector 72, gamma corrector 74, and RGB interpolator 76.

Referring back to FIG. 2, the signal processor 18 supplies the image data processed in the recording mode to the media IF circuit 28 over the signal line 66, bus 64, and signal line 88. Further, the signal processor 18 outputs a signal 90 for liquid crystal display to the monitor display 32.

Figure 8:
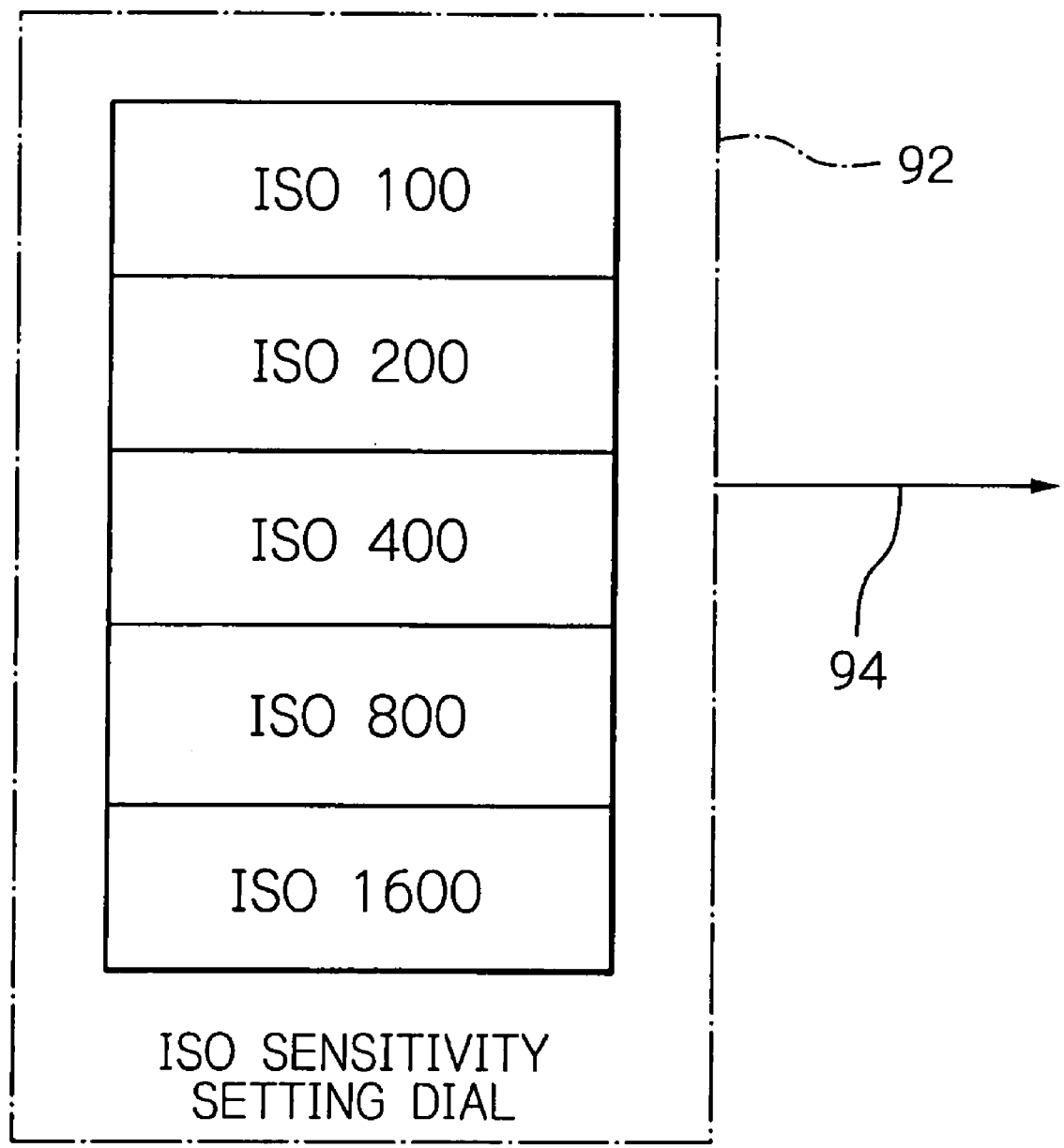
FIG. 8 is a plan view of an operation panel of the digital camera shown in FIG. 2.

The operation or control panel 20 includes a power switch, a zoom button, a menu display switch including a cross key, a setting and selector key, a motion picture mode setting unit, a continuous shooting speed setting unit, and a shutter release button, although not specifically shown. As shown in FIG. 8, the operation panel 20 contains an ISO (International Organization for Standardization) sensitivity setting dial 92 as one selector of the setup menus. The ISO sensitivity setting dial 92 contains setting values 100 to 1600 as the ISO sensitivity, a sort of optical sensitivity, and outputs an operation instruction signal 94 indicating the selected ISO sensitivity to the system controller 22. Further, the shutter release button provides the system controller 22 with information on a depress timing at which the shutter release button on the digital camera 10 is depressed to its half or full stroke. When the shutter release button is depressed to its half stroke, the camera 10 operates in an automatic exposure (AE) and an automatic focusing (AF) mode. In this operation, an image signal in a moving picture display mode is used to determine the optimum aperture stop radius, the optimal shutter speed, and the optimum focal distance. In response to the half-depressing of the shutter release button, the operation panel 20 outputs an operation instruction signal 94 accordingly to the system controller 22. Further, in response to the full-depressing of the shutter release button, the operation section 20 provides the system controller 22 with the operation instruction signal 94 indicating the timing at which recording is initiated and then completed. The operation panel 20 notifies the system controller 22 of a setting mode designated by the operation instruction signal 94. Examples of the setting mode include a still image recording mode and a moving picture recording mode, etc.

Figure 9:
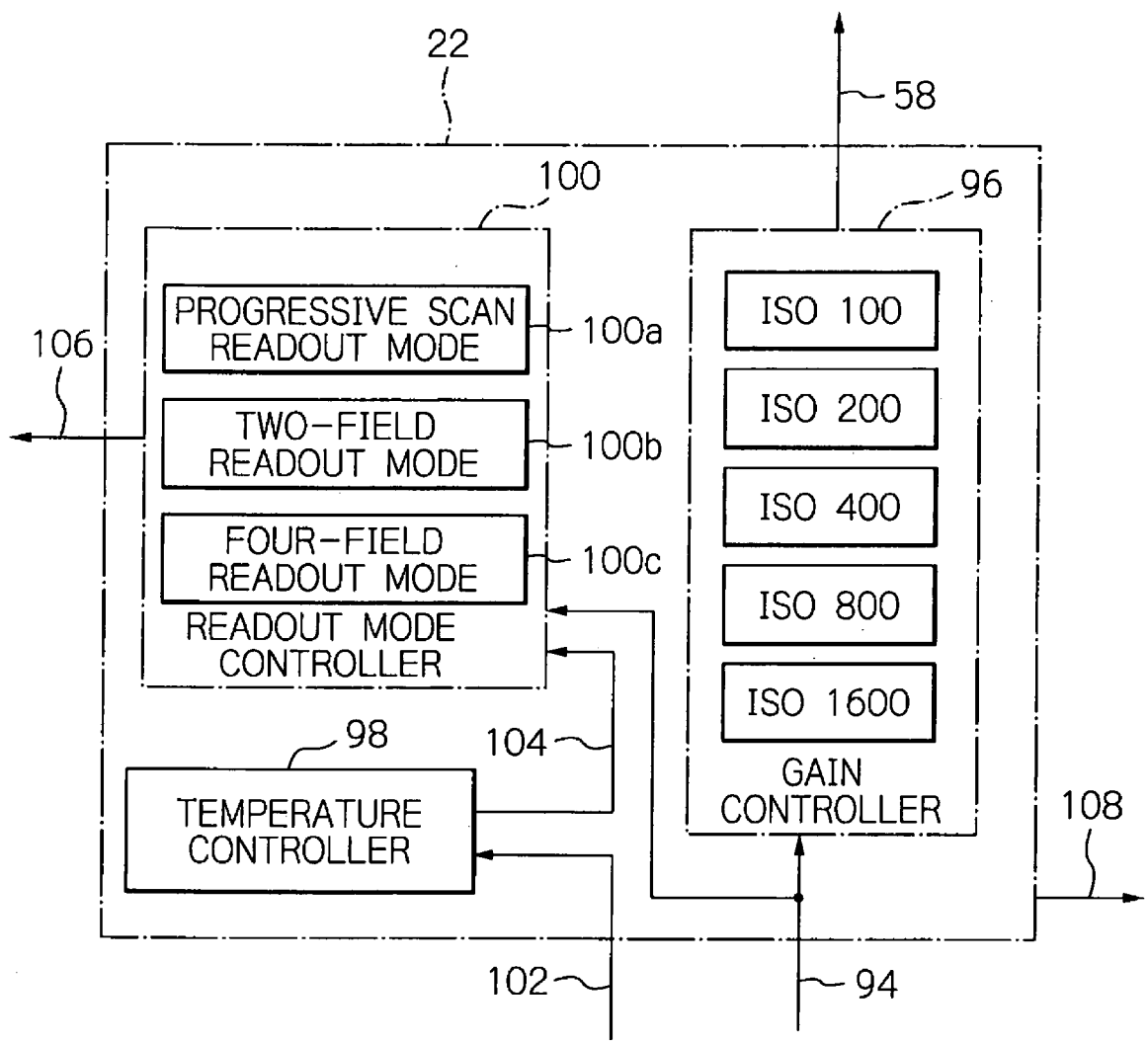
FIG. 9 is a schematic block diagram showing a configuration of a system controller of the digital camera shown in FIG. 2.

The system controller 22 serves as generating various types of control signals depending on the operation instruction signal 94 provided from the operation panel 20. As shown in FIG. 9, in order to generate these control signals, the system controller 22 includes a gain controller 96, a temperature controller 98, and a readout mode controller 100. The gain controller 96 receives the operation instruction signal 94 indicating a selected ISO sensitivity from the operation panel 20 and generates a gain control signal 58 representing the ISO sensitivity. The gain controller 96 generates a gain control signal 58 corresponding to ISO sensitivity 100, 200, 400, 800, or 1600. The operation instruction signal 94, representing an ISO sensitivity, from the operation panel 20 is also supplied to the read out mode controller 100. The temperature controller 98 receives sensing information 102 from the temperature sensor 34, detects the temperature of the solid-state image pick-up device 36 based on the received sensing information 102, compares the detected temperature with a predetermined temperature threshold, and outputs an adjustment value 104 depending on the result of the comparison to the readout mode controller 100.

The readout mode controller 100 serves as selecting a readout mode and generates a mode control signal 106 used to read out signal charges in the selected readout mode. The readout mode controller 100 produces the mode control signal 106 so as to allow signal charges to be read out in either one of the progressive scan readout mode 100a, two-field readout mode 100b and four-field readout mode 100c. More particularly, as will be described later, when control is made on a conventional type of solid-state image pick-up device in which the electrodes connected to the transfer shift gates (TG) serving as gates for reading out signal charges from the photosensitive cells 38 are not alternately arranged but the electrodes not connected to the transfer shift gates are alternately arranged between two successive rows on two adjacent vertical transfer paths, the readout mode controller 100 selects the number of drive phases as well as a readout mode to generate a mode control signal depending on the selected readout mode. In this case, the readout mode controller 100 generates the mode control signal 106 based-on either one of the operation instruction signal 94 indicating the ISO sensitivity and provided from the operation panel 20 and the adjustment value 104. The readout mode controller 100 selects, for example, when the ISO sensitivity is set high or the temperature T is high, the drive scheme of a relatively larger number of drive phases, and generates the mode control signal 106 requiring a higher number of readout operations, i.e., indicating a readout mode using a large number of fields.

The readout mode controller 100 is responsive to either one of the operation instruction signal 94 indicating the ISO sensitivity and fed from the operation panel 20 and the adjustment value 104 to select one of these readout modes, and generates the mode control signal 106 so as to allow signal charges to be read out in the selected readout mode to output the generated mode control signal 106 to the timing signal generator 24 and the driver 26.

Referring again back to FIG. 2, the system controller 22 includes a setting operation controller, not shown. The setting operation controller receives, as information on setting conditions, an operation signal 56 from the operation panel 20 and the detected temperature, generates, based on the setting conditions, a control signal 108 used to control the signal processor 18, and outputs the control signal 108 to the signal preprocessor 18 over the bus 64 and the signal line 66. The control signal 108 is also supplied to the storage IF circuit 28 over the bus 64 and the signal line 88.

The timing signal generator 24 functions as generating timing signals such as vertical and horizontal synchronous signals, a field shift gate signal, vertical and horizontal timing signals, and an overflow drain (OFD) signal, etc., for allowing the image pick-up unit 14 to operate and the preprocessor 16 to perform sampling and conversion. The timing signal generator 24 generates various types of timing signals 110 depending on the mode control signals 106 supplied from the system controller 22. The timing signal 110 defines the control timing depending on the modes such as the whole pixel readout mode, two-field readout mode, and four-field readout mode. The timing signal generator 24 outputs these timing signals 110 to the driver 26.

The driver 26 is adapted to use various types of timing signals 110 supplied from the timing signal generator 24 to generate vertical and horizontal drive signals. The driver 26 adjusts the number of drive phases in response to the mode control signal 106 and generates a drive signal accordingly. In this way, the driver 26 supplies the vertical and horizontal drive signals to the image pick-up unit 14 so as to allow signal charges to be read out in a selected readout mode.

The storage IF circuit 28 is configured to either allow recording or reproducing of image data depending on which kind of recording medium is used. The storage IF circuit 28 may provide control for writing or reading image data 114 to or from a PC (Personal Computer) card, a sort of semiconductor storage medium, or for writing to or reading from a USB (Universal Serial Bus) type of storage when a USB controller is installed in the storage IF circuit 28. Various kinds of semiconductor memory card standards are applicable to the storage 30. The monitor display 32 is implemented by a liquid crystal display, etc. The monitor display 32 functions as displaying image data 90 supplied from the signal processor 18.

The temperature sensor 34 functions as obtaining information indicative of the temperature of the surrounding environment of the camera 10. Preferably, the temperature sensor 34 is located near the solid-state image pick-up device 36 of the image pick-up unit 14, particularly near the floating diffusion amplifier, not shown, apt to generate a rather large amount of heat and sense the temperature. Providing the temperature sensor 34 in this way allows for precise monitoring of the temperature of interest within the digital camera 10.

Since the digital camera is configured as described above, signals charges can be prevented from staying longer in a vertical transfer path under the electrodes connected to the transfer shift gates during a horizontal scanning period even when the digital camera 10 comprises an interlace scanning type (IT-type) of solid-state image pick-up device 36, thereby reducing dark current, which might be generated during image pick-up operation.

The invention is not limited to the specific type of digital camera 10 as described above as an exemplary embodiment in which the electrodes connected to the transfer shift gates are sequentially arranged in two adjacent vertical transfer paths. Rather, even when the electrodes connected to the transfer shift gates are arranged in the conventional manner, the electrodes are driven with different time sequence, which can be adjusted depending on how an object is captured by the camera 10, thereby reducing dark current, which might be generated during image pick-up operation. How the electrodes of the image pick-up device are driven will be disclosed below.

Figure 10:
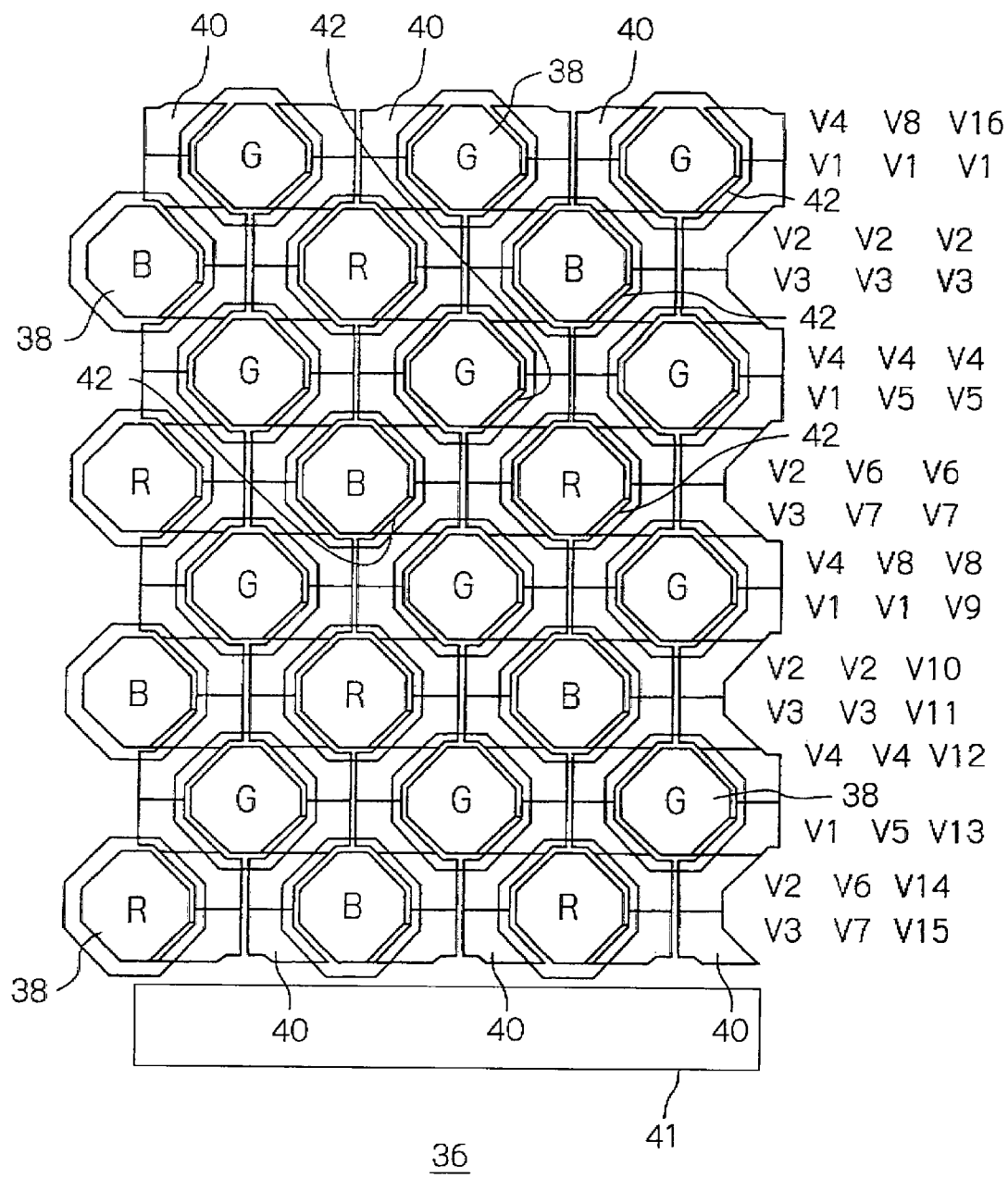
FIG. 10 schematically shows a configuration of a solid-state image pick-up device having an array of photosensitive cells shifted in position relatively to each other to which the invention is applied.
Figure 11:
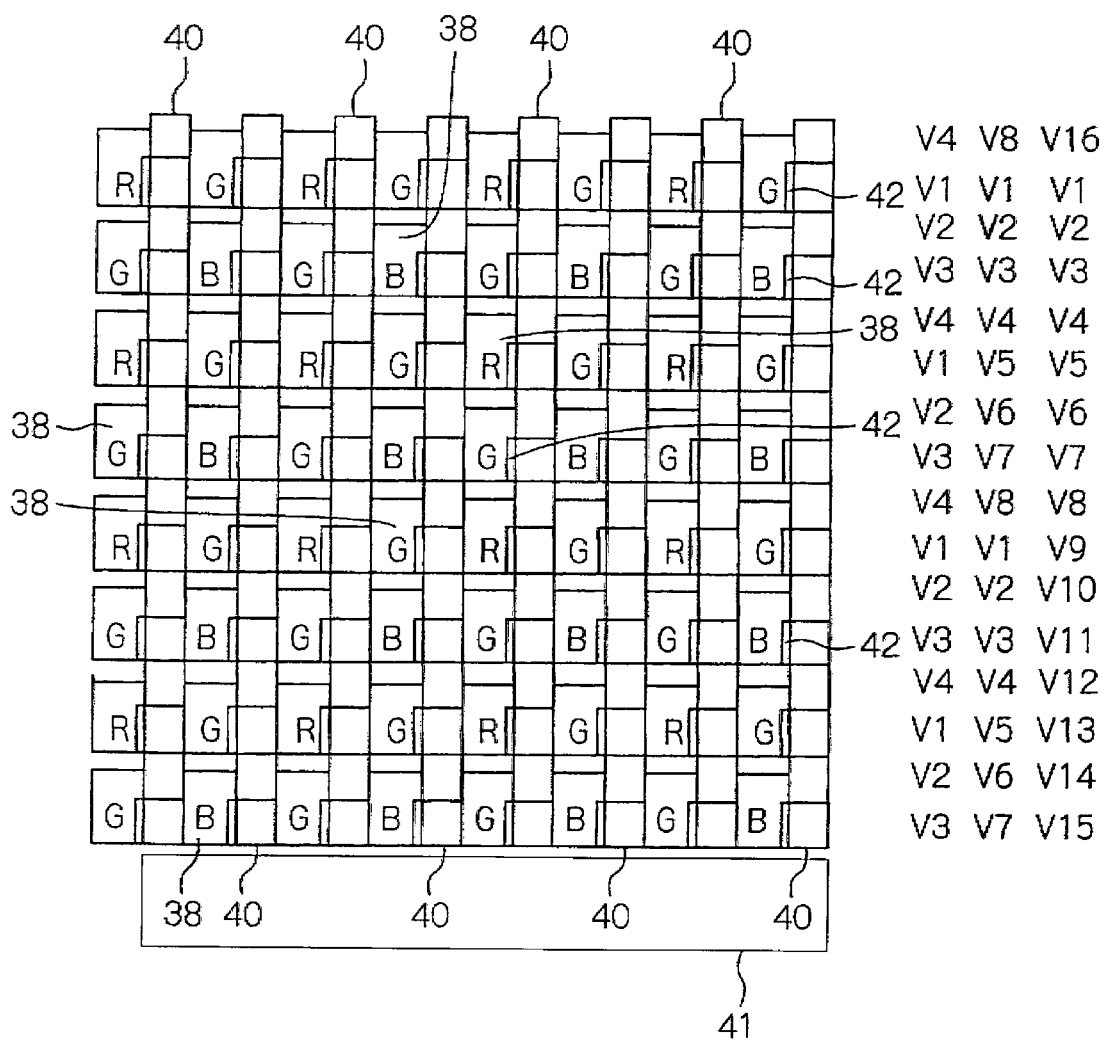
FIG. 11 schematically shows a configuration of a solid-state image pick-up device having an array of photosensitive cells positioned in a square lattice to which the invention is applied.

As shown in FIGS. 10 and 11, the digital camera 10 comprises the image pick-up device 36 in which electrodes connected to transfer shift gates and electrodes not connected to the transfer shift gate are alternately arranged in two successive rows on two adjacent vertical transfer paths similarly to the conventional manner. More specifically, when the vertical transfer path is driven by four-phase drive signals, electrodes V1 and V3 are connected to the transfer shift gates, and when the vertical transfer path is driven by eight-phase drive signals or by sixteen-phase drive signals, electrodes V1, V3, V5, and V7, or electrodes V1, V3, V5, V7, V9, V11, V13, and V15 are connected to the transfer shift gates.

It will now be described how the vertical transfer path is driven by four-phase vertical drive signals in the solid-state image pick-up device 36 of the embodiment. Thresholds required by the digital camera 10 are previously set in the system controller 22. The thresholds are defined for two parameters, i.e., sensitivity and temperature. For example, threshold sensitivity and threshold temperature are ISO 800 and 50 degree centigrade, respectively.

Figure 12:
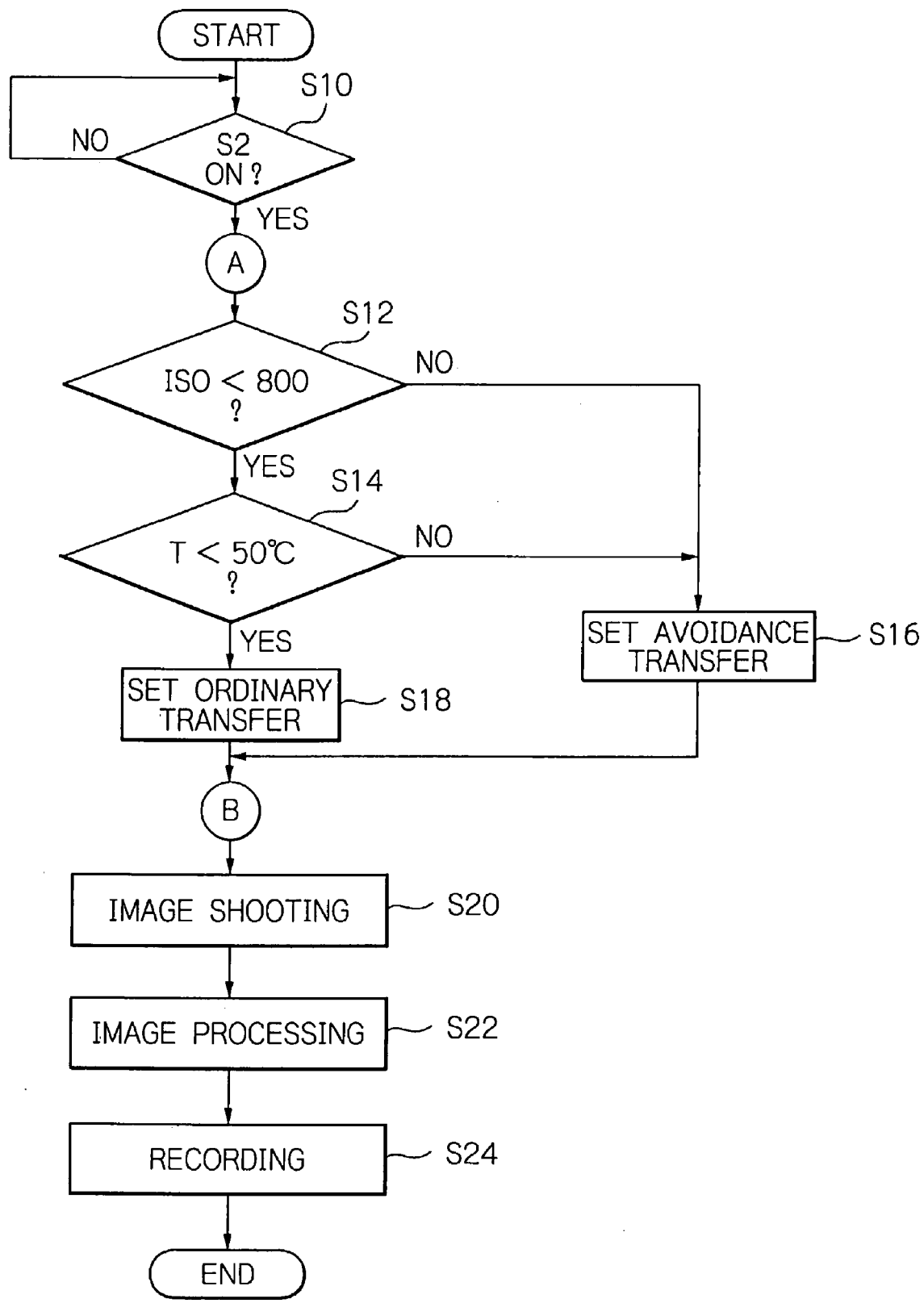
FIG. 12 is a flow chart useful for understanding an operation sequence according to the embodiment of the digital camera comprising the solid-state image pick-up device shown in FIGS. 10 and 11.

As shown in FIG. 12, first, it is determined whether or not the shutter release button on the digital camera 10 has been full-depressed (step S10). If the shutter release button is in the full-depressed state S2 (YES), the process proceeds through a connection A to a determination step S12, where it is determined which one of the ISO sensitivities has been selected by the user. Otherwise, if the shutter release button is not in the state S2 (NO), then the process returns to the step S10, where it is determined whether or not the shutter release button has been full-depressed.

Next, operation instruction information 94 indicative of the ISO sensitivity selected by the user is supplied from the operation panel 20 to the system controller 22. The system controller 22 determines whether or not the operation instruction information 94 is below the threshold sensitivity of ISO 800 (step S12). If the ISO sensitivity selected by the user is less than the threshold sensitivity of ISO 800 (YES), the process proceeds to the step S14, where the temperature sensed by the sensor is detected. This procedure is conducted when an ISO sensitivity selected by the user is low. The low sensitivity implies that a number of electrons caused by the short channel effect are accumulated in a potential well and the well fills up, producing a saturation effect. Further, if the ISO sensitivity selected by the user is not less than the threshold sensitivity of ISO 800 (NO), the process proceeds to a thermally-induced-electron reduction transfer step S16, i.e., avoidance transfer step.

Now, the process proceeds to a step S14, where if the detected temperature T, which is determined based on the detection information 94 supplied from the temperature sensor 34, is below the threshold temperature of 50 degree centigrade. If the detected temperature T is below the threshold temperature of 50 degree centigrade (YES), the process proceeds to an ordinary or conventional transfer step S18. Further, if the detected temperature T exceeds the threshold temperature of 50 degree centigrade (NO), the process proceeds to the avoidance transfer step S16. In this state, there is observed a significant difference in dark current at different locations of the vertical transfer path. Specifically, dark current increases at the upper area of the screen and decreases at the lower area thereof, and therefore there is difference in the levels of noise between the image data sets. Consequently, the quality of image is degraded.

In the avoidance transfer setting step S16, a voltage on the electrodes connected to the transfer shift gates 42 (TG) is changed to the level "L" before the horizontal scanning period and a voltage on at least the electrodes, i.e., the electrodes V1 connected to the transfer shift gates 42 is changed to the level "M" (mid level) during the vertical transfer period after the horizontal scanning period. In the illustrative embodiment, the number of electrons accumulated in the transfer path below the electrodes V1 and V3 driven by four-phase drive signals is reduced. Thus, the amount of dark current generated is reduced. In the conventional vertical transfer step, signal charges are vertically transferred in a conventional manner (step S18).

Figure 13A:
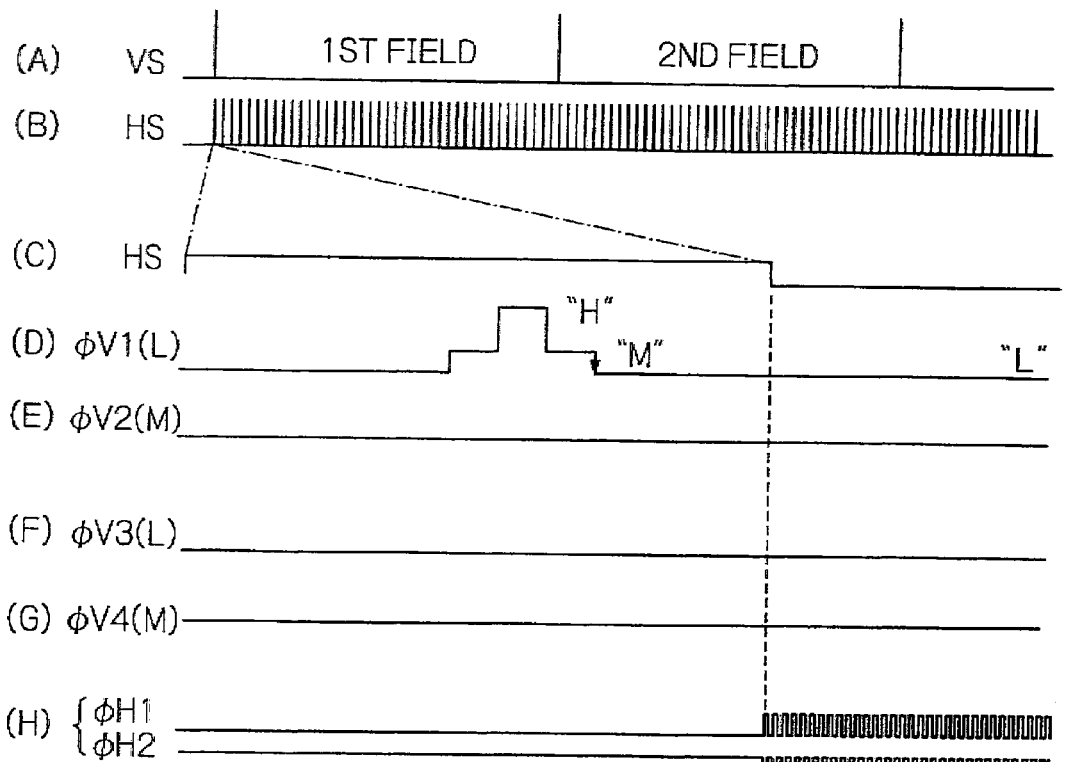
FIGS. 13A, 13B and 14 are timing charts showing operation timing in the solid-state image pick-up device shown in FIG. 11 to which a driving method of the present invention is applied.
Figure 14:
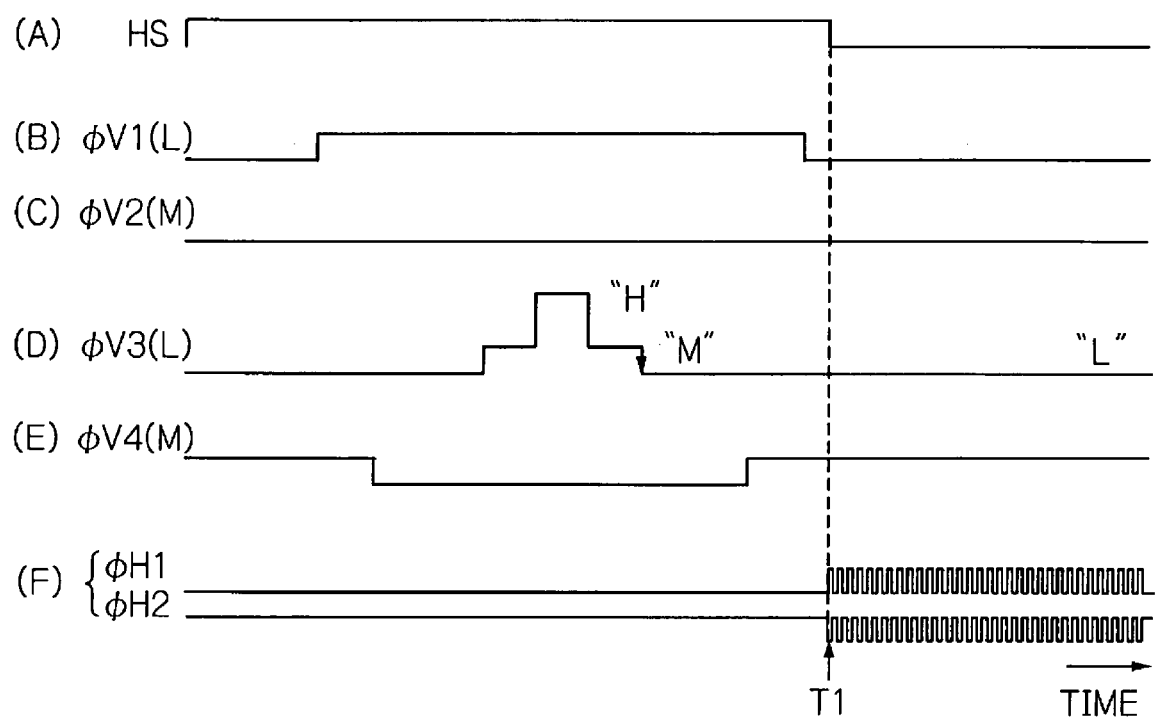

After the avoidance transfer setting step S16 or the conventional vertical transfer step S18, the process proceeds through a connection B to an image pick-up or shooting step S20, where the image of a scene is captured using the settings determined in the preceding steps. In the illustrative embodiment, the solid-state image pick-up device 36 including the same square lattice pixel array as shown in FIG. 11 is employed. As can be seen from FIG. 11, the electrodes V1 and V3 are connected to the transfer shift gates 42 (TG). The electrodes V2 and V4 not connected to the TGs are adapted to form potential wells apart from each other. During formation of such potential wells, particularly during the avoidance transfer step, only a vertical drive signal ΦV1 shown in FIG. 13A, line (D), among lines (D) through (G) changes its level from "L" through "M", "H", "M" to "L" before a horizontal scanning period of the first filed, i.e., until time T1, and only a vertical drive signal ΦV3 shown in FIG. 14, line (D), among lines (B) through (E) changes its level from "L" through "M", "H", "M" to "L" before a horizontal scanning period of the second filed, i.e., until time T1.

Figure 13B:
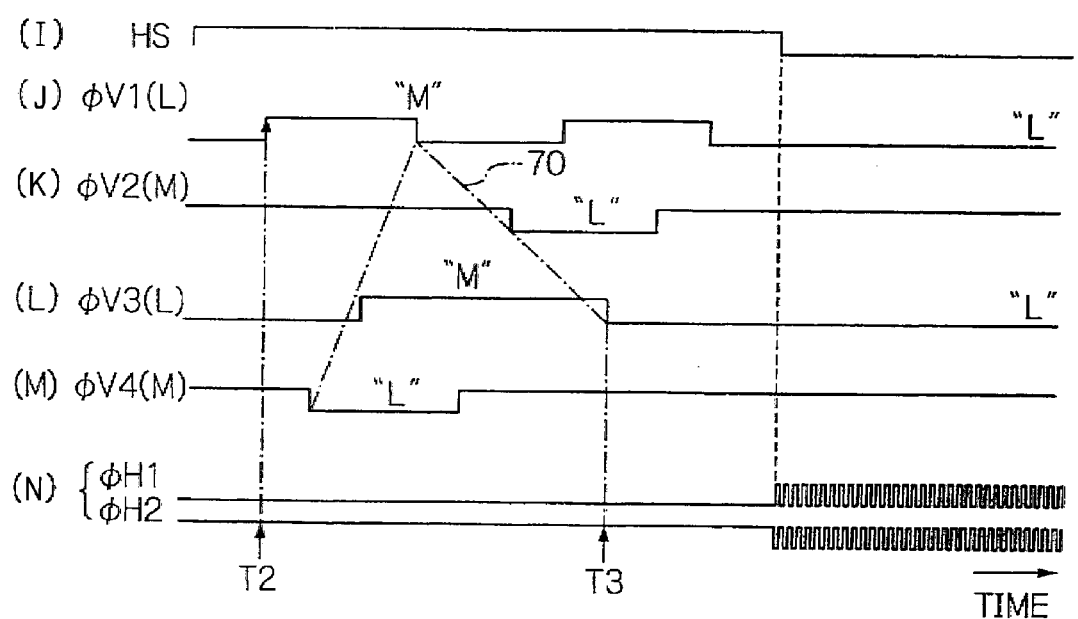

Further, after the signal charges are read out in the first and second fields, the signal charges are horizontally transferred starting at time T1. It can be seen from FIG. 13B, lines (B) to (E) that the time at which the levels of vertical drive signals are first changed from "L" to "M" is time T2 during a vertical transfer period after the horizontal scanning period. At time T2, the vertical drive signal ΦV1 shown in FIG. 13B, line (B), is supplied to the electrodes V1 connected to at least one transfer shift gates 42. The vertical drive signals shown in FIG. 13B, lines (J) to (M), drive the corresponding electrodes so that a charge packet formed below the electrode V4 is first formed below the electrode V1 during vertical transfer. Afterwards, as shown by a dot-and-dash line 70, corresponding charge packets are formed below the electrodes V2, V3, and V4. The signal charges are transferred by the charge packet formed below the corresponding electrode. These stages of consecutive vertical transfer are performed in a similar way also in the second field.

Referring back to FIG. 12, in the digital camera 10, the signal charges accumulated in the photosensitive cells of the image pick-up unit 14 are read out in the corresponding modes and an analog signal 44 is output to the preprocessor 16. The preprocessor 16 converts the analog signal 44 to image data 62 and outputs the data to the signal processor 18.

Next, the signal processor 18 performs image processing on image data 62 supplied from the preprocessor 16 (step S22). The image data processed is passed through the storage IF circuit 28 to the storage 30 for storing the data (step S24). Then, the process ends.

Since the image pick-up device 36 is operated in the manner as described above, the duration for which the signal charges stay in a vertical transfer path below the electrodes V1 and V3 connected to the transfer shift gates 42 (TG) is reduced and dark current due to thermally generated carriers can be reduced. Consequently, degradation of picture the quality of image photographed with the digital camera 10 can be prevented.

Figure 15:
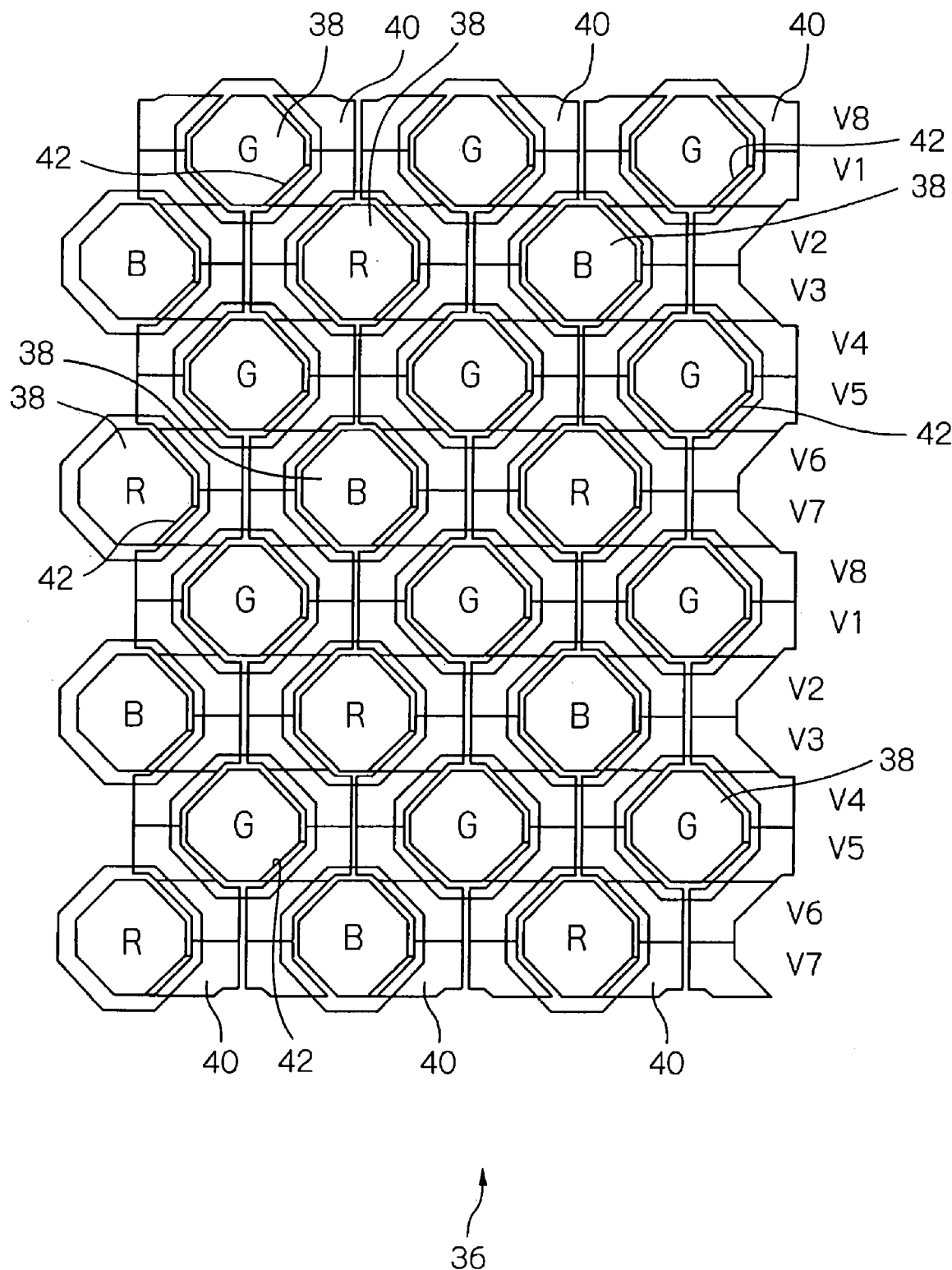
FIG. 15 schematically shows a configuration of a solid-state image pick-up device having an array of photosensitive cells shifted in position with respect to each other to which the invention is applied.

Well, an alternative embodiment of the digital camera 10 comprising a solid-state image pick-up device according to the invention will be described briefly. As shown in FIG. 15, the solid-state image pick-up device 36 employed in the alternative embodiment comprises an array of pixels for receiving light 13 which are diagonally offset from each other, i.e., arranged in a so-called honeycomb like regular pattern, in which signal charges stored in the pixels are read out therefrom by eight-phase vertical drive signals. The system controller 22 generates a mode control signal 106 used to select either one of the readout modes, i.e., progressive scan or interlace scan mode, so that a timing signal is generated based on the result of comparison between information on image pick-up conditions and a threshold value set, and outputs the timing signal to the timing signal generator 24. The timing signal generator 24 generates a timing signal for either one of the progressive scan and interlace scan modes in response to the mode control signal 106 supplied and outputs the timing signal to the driver 26. The driver 26 generates a drive signal 112 and outputs the signal to the solid-state image pick-up device 36 of the image pick-up unit 14.

It is to be noted that in the solid-state image pick-up device 36 according to the alternative embodiment, the array of electrodes are arranged to read out signal charges from all the pixels. In the embodiment, the solid-state image pick-up device 36 is operated in either one of the progressive scan and interlace scan modes so as to allow signal charges to be read out by the drive signal output from the driver 26. Particularly, when the image pick-up device 36 is operated in the interlace scan mode, it is preferred that the avoidance transfer step is performed as in the case described with regard to the foregoing embodiment.

Now, operation of the digital camera 10 comprising the solid-state image pick-up device 36 will be described. The digital camera 10 compares information on image pick-up conditions to predetermined thresholds before image pick-up operation and selects either one of the progressive scan and interlace scan modes based on the result of the comparison. Note that in the embodiment of the digital camera 10, threshold exposure time and threshold temperature are set in advance. The threshold exposure time and threshold temperature in the embodiment are 3 seconds and 50 degree centigrade, respectively.

Figure 16:
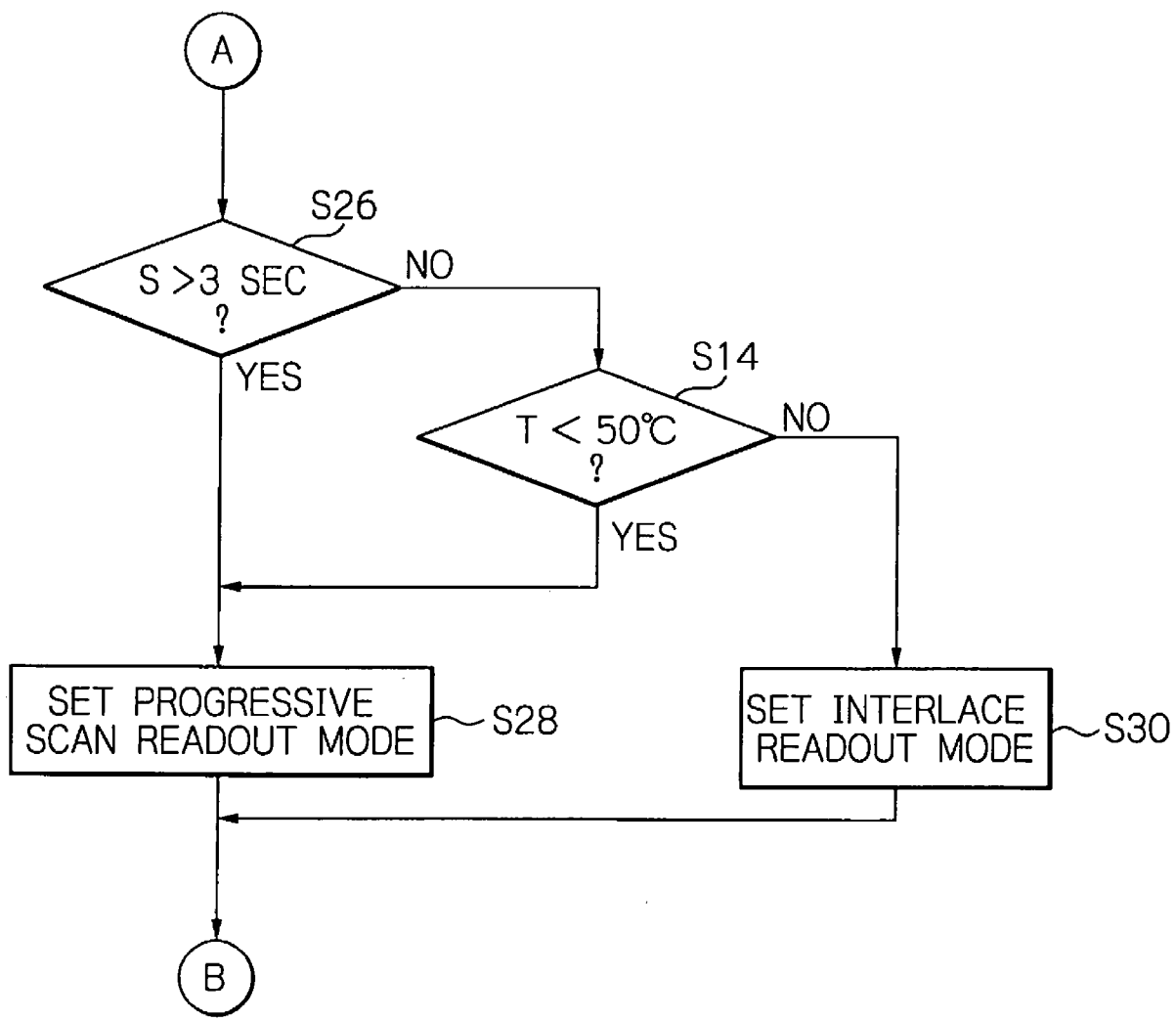
FIGS. 16, 17 and 18 show relevant part of a timing chart useful for understanding a general operation sequence in the digital camera comprising the solid-state image pick-up device shown in FIG. 15 to which a driving method of the present invention is applied.

Description of the same operation procedure as shown in FIG. 12 will not be repeated here in order to avoid redundancy. First, it is determined whether or not a shutter release button on the digital camera 10 is depressed to its full stroke (step S10). As shown in FIG. 16, if the shutter release button is in the state S2 (YES), the process proceeds through the connection A to a determination step S26, where exposure time is determined.

Next, it is determined whether or not the exposure time determined by calibration, i.e., a time parameter is greater than the exposure threshold of 3 seconds (step S26). If the time parameter is greater than the exposure threshold of 3 seconds (YES), then the process proceeds to a step S28 where progressive scan readout mode is selected. If the time parameter is less than the exposure threshold of 3 seconds (YES), then the process proceeds to a step S14 where the detected temperature is determined.

Next, it is determined whether or not the detected temperature T determined based on the detection information 102 from the temperature sensor 34 is less than the temperature threshold of 50 degree centigrade (step S14). If the detected temperature T is less than the temperature threshold of 50 degree centigrade (YES), the process proceeds to the step S28 where progressive scan readout mode is selected. Further, if the detected temperature T is greater than the temperature threshold of 50 degree centigrade (NO), the process proceeds to the step S30 where an interlace scan mode is selected.

Next, the process sets in the progressive scan readout mode, signal charges are read out from the whole pixels by progressive scanning (step S28). In this case, the number of read fields is reduced to one before an extensive exposure. Accordingly, defects, which are formed in photosensitive cells, result from the extensive exposure, and tend to cause deterioration of the quality of image, can be suppressed.

Next, the process sets in the interlace scan mode, signal charges are readout in two fields, i.e., first and second fields. More specifically, when the exposure time is not longer than 3 seconds and the temperature T is not less than 50 degree centigrade, the number of fields is increased to two. This reduces the deterioration of the quality of image, which is caused by the fact that dark current increases at the upper area of the vertical transfer path and decreases at the lower area thereof, as will be described earlier.

Successively, the process proceeds through the connection B to an image pick-up step. In the image pick-up step, signal charges accumulated during an exposure period in the individual photosensitive cells are read out in the corresponding scanning modes and vertically transferred. In other words, the solid-state image pick-up device 36 operates so that during image pick-up operation, the number of read lines per field is increased in the case of extensive exposure and the number of read lines per field is reduced in the case of short exposure and high temperature, in order to vertically transfer signal charges.

Since the digital camera 10 is operated as described above, defects formed in the photosensitive cells and resulting from extended exposure can be suppressed and further difference in dark current patterns at the upper and lower screen at high temperature can be reduced.

Figure 17:
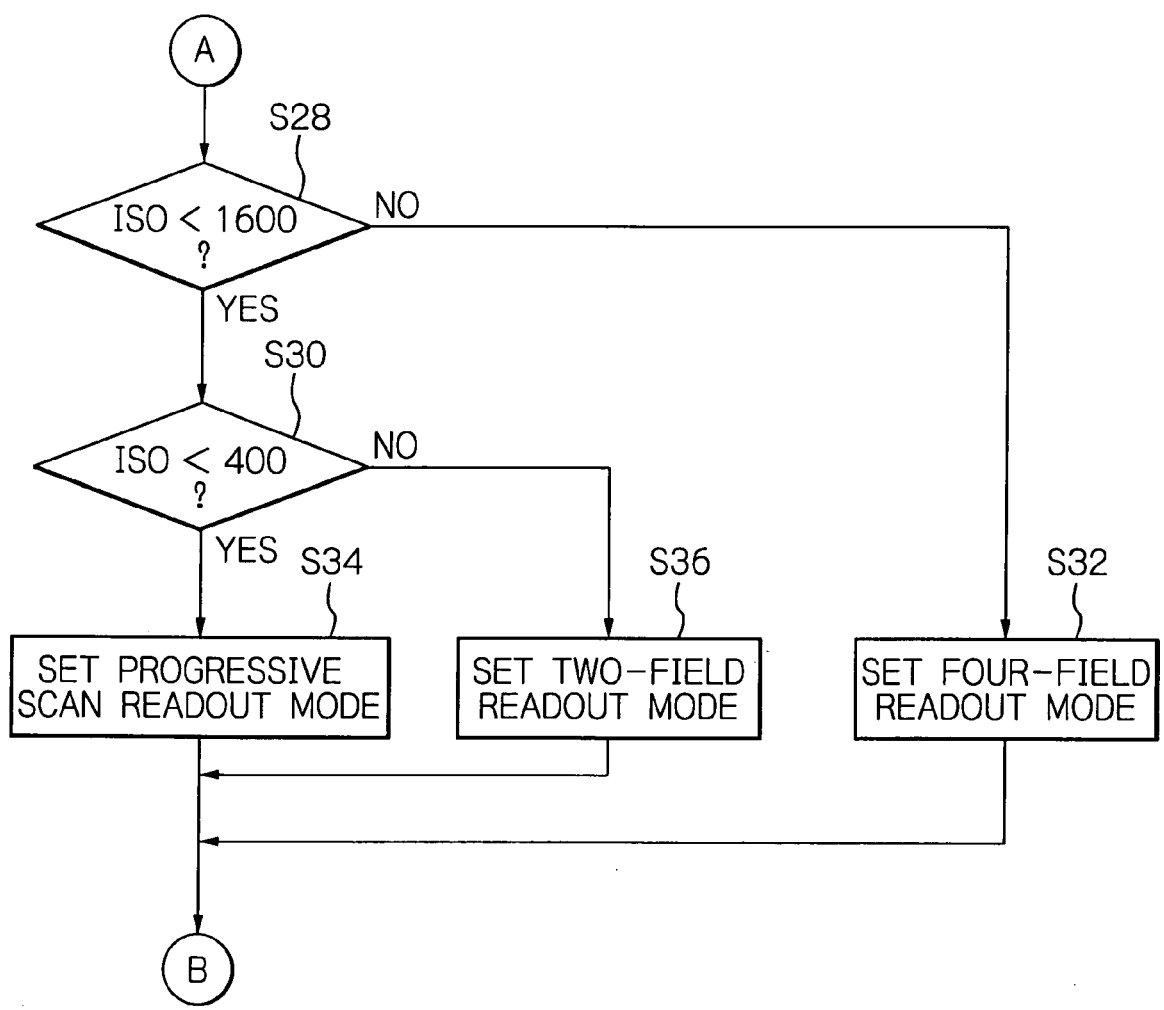

Further, when the solid-state image pick-up device 36 shown in FIGS. 10 and 15 is employed, it may be contemplated that a plurality of threshold sensitivities are set in advance in the system controller 22 and either one of three readout modes, i.e., progressive scan, two-field, and four-field readout modes is selected in dependent upon an ISO sensitivity selected. This operation sequence is generally shown in FIG. 17. In the digital camera 10, two threshold sensitivities of ISO 1600 and 400, are set in advance in the system controller 22. When the user operates the digital camera 10, the process proceeds through the connection A to a step S28 where it is determined whether or not the ISO sensitivity is less than 1600. If the ISO sensitivity is smaller than 1600 (YES), the process proceeds to the next step S30, where it is determined whether or not the ISO sensitivity is smaller than 400. Further, if the ISO sensitivity is equal to or larger than 1600 (NO), the process proceeds to the step S32, where four-field readout mode is selected.

Next, the digital camera 10 determines whether or not the ISO sensitivity is smaller than 400 (step S30). If the ISO sensitivity is smaller than 400 (YES), the process proceeds to a step S34, where progressive scan readout mode is selected. Further, if the ISO sensitivity is equal to or larger than 400 (NO), the process proceeds to a step S36, where two-field readout mode is selected.

In the digital camera 10, when the ISO sensitivity is smaller than 400, the system controller 22 instructs the readout mode controller 100 to output a control signal 106 for selecting a progressive scan readout mode (step S34). In the progressive scan readout mode, signal charges read out from the whole pixels are sequentially transferred. When photographs are taken at a low sensitivity, it is likely that the number of electrons to be transferred is increased and the electrons caused by the short channel effect are accumulated in the well and the well fills up, producing a saturation effect. When the user sets the camera to an ISO sensitivity of less than 400, it is preferred that transfer electrodes are driven with a smaller number of drive phases. In the embodiment, signal charges are sequentially transferred by four-phase drive signals. In the vertical transfer of signal charges, the phenomenon that signal charges are apt to decrease or deteriorate due to thermal saturation diffusion during vertical transfer can be avoided. Further, in this readout mode, the number of fields is not unnecessarily increased. That is, in this readout mode, a frame rate represented by sweep-out frequency times the number of fields needs not to be increased.

Further, when the ISO sensitivity is smaller than 1600 but equal to or larger than 400, the system controller 22 instructs the readout mode controller 100 to output a control signal 106 for selecting a two-field readout mode (step S36). The two-field readout mode is an interlace scan mode in which signal charges are read out from all the pixels in two fields and the signal charges read out in each field are transferred.

Further, when the ISO sensitivity is equal to or larger than 1600, the system controller 22 instructs the readout mode controller 100 to output a control signal 106 for selecting a four-field readout mode (step S32). The four-field readout mode is an interlace scan mode in which signal charges are read out from all the pixels in four fields and the signal charges read out in each field are transferred. When photographs are taken at such high sensitivity, it is preferred that the digital camera 10 operates so that signal charges are kept stored in the photosensitive cells with relatively small dark current during readout operation and the number of drive phases is increased while relatively large number of fields is used. In the embodiment, the number of drive phases is eight while the number of read fields is four. This allows the signal charges read out to the vertical transfer path 40 to reside in the vertical transfer path 40 accompanied with higher dark current for a shorter period of time.

After one of the readout modes for transferring signal charges is selected in the digital camera 10 based on the result of comparison between the selected ISO sensitivity and a threshold sensitivity, the process proceeds through the connection B to an image pick-up step. Since the digital camera is operated as described above, the duration for which signal charges reside in the vertical transfer path 40 is changed and dark current generation is reduced. The reduction in dark current prevents deterioration of the quality of image to be produced.

Figure 18:
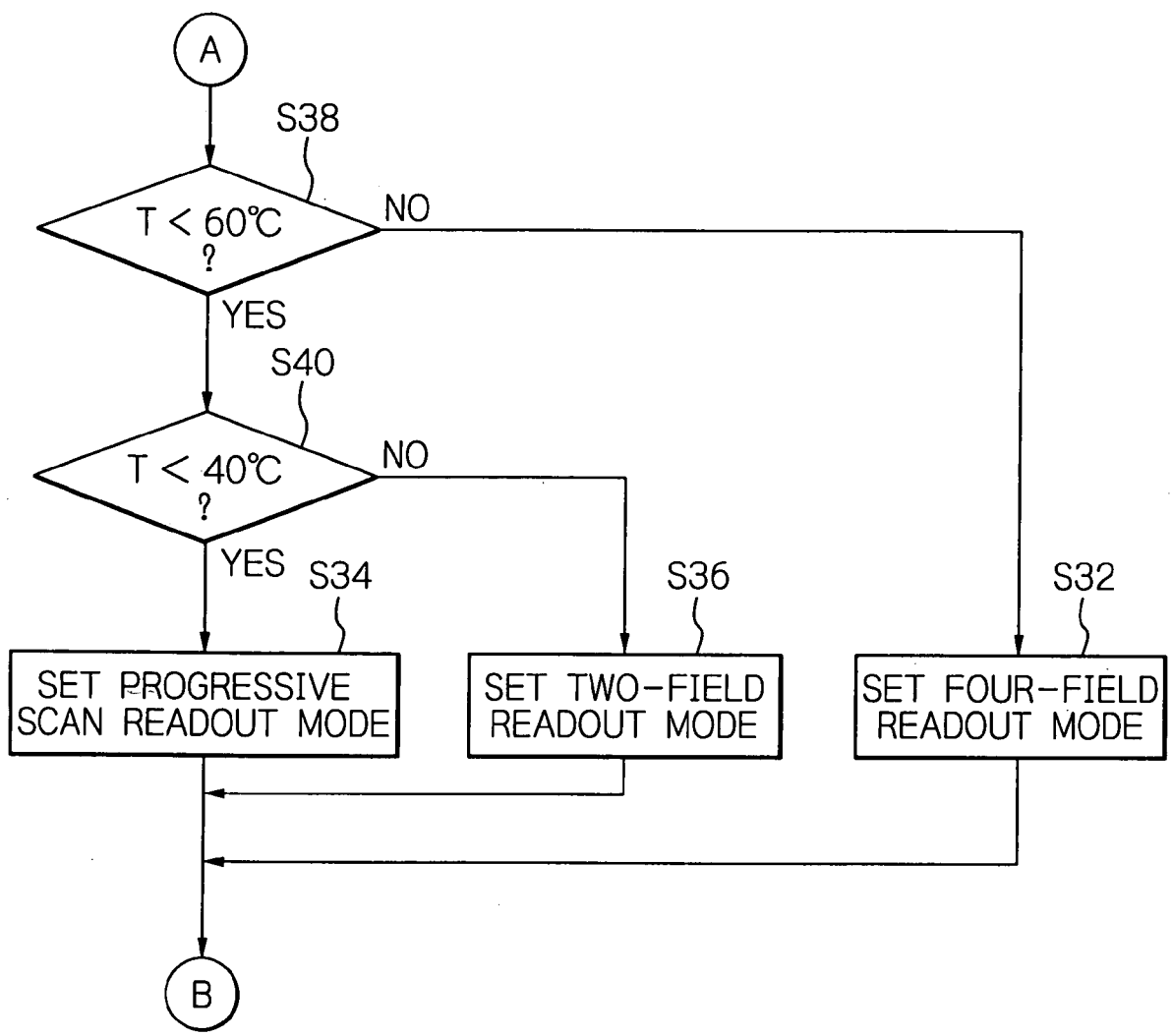

It may be contemplated that the readout mode is selected based on the result of comparison between detected temperature and threshold temperature, rather than the result of comparison between ISO sensitivity and threshold sensitivity. This operation sequence is generally shown in FIG. 18. In the digital camera 10, threshold temperatures of 60 degree centigrade and 40 degree centigrade are previously set in the system controller 22. When the user operates the digital camera 10, the process proceeds through the connection A to a step S38 where it is determined whether or not the temperature T is lower than 60 degree centigrade. If the temperature T is lower than 60 degree centigrade (YES), the process proceeds to the next step S40, where it is determined whether or not the temperature T is lower than 40 degree centigrade. Further, if the temperature T is not lower than 60 degree centigrade (NO), the process proceeds to a step S32, where a four-field readout mode is selected.

Then, the digital camera 10 determines whether or not the temperature T is lower than 40 degree centigrade (step S40). If the temperature T is lower than 40 degree centigrade (YES), the process proceeds to a step S34, where progressive scan readout mode is selected. Further, if the temperature T is not lower than 40 degree C. (NO), the process proceeds to the step S36, where a two-field readout mode is selected.

When it is determined that the temperature T is lower than 40 degree centigrade in the digital camera 10, the system controller 22 instructs the readout mode controller 100 to output a control signal 106 for selecting a progressive scan readout mode (step S34). The progressive scan readout mode is a mode in which signal charges read out from all the pixels are sequentially transferred. When the temperature T is lower than 40 degree centigrade, signal charges readout from all the pixels are sequentially transferred by a smaller number of drive phase signals, i.e., progressive scan drive signals, as in the case described with regard to the foregoing embodiment where ISO sensitivity is smaller than 400, thereby avoiding the phenomenon that signal charges are apt to decrease or deteriorate due to thermal saturation diffusion during vertical transfer and preventing the number of fields from being unnecessarily increased.

Further, when the temperature T is lower than 60 degree centigrade and not lower than 40 degree centigrade, the system controller 22 instructs the readout mode controller 100 to output a control signal 106 for selecting a two-field readout mode (step S36). The two-field readout mode is an interlace scan mode in which signal charges are read out from all the pixels in two fields and the signal charges read out in each field are transferred.

Further, when the temperature T is not lower than 60 degree centigrade, the system controller 22 instructs the readout mode controller 100 to output a control signal 106 for selecting a four-field readout mode (step S32). The four-field readout mode is an interlace scan mode in which signal charges are read out from all the pixels in four fields and the signal charges read out in each field are transferred.

When photographs are taken at a high temperature such as not lower than 60 degree centigrade, it is preferred that the digital camera 10 operates so that signal charges are kept stored in photosensitive cells with relatively small dark current during readout operation and the number of drive phases is increased while relatively large number of fields is used. In the embodiment, the number of drive phases is eight while the number of read fields is four. This allows the signal charges readout to the vertical transfer path 40 to reside in the vertical transfer path 40 accompanied with higher dark current for a shorter period of time.

After one of the readout modes for transferring signal charges is selected in the digital camera 10 based on the result of comparison between the detected temperature T and a threshold temperature, the process proceeds through the connection B to an image pick-up step. Since the digital camera 10 is operated as described above, the duration for which signal charges reside in the vertical transfer path 40 is changed and dark current generation is reduced. The reduction in dark current prevents deterioration of the quality of image to be produced.

Although the embodiment employs the three readout modes, the system may be adapted such that not less than four readout modes are available, for example, by adding eight-field or sixteen-field readout mode to the current readout modes. Further, it may be contemplated that the digital camera 10 is operable in two of the three readout modes.

The entire disclosure of Japanese patent application Nos. 2006-81022 and 2006-355815 filed on Mar. 23 and Dec. 28, 2006, including the specifications, claims, accompanying drawings and abstracts of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A solid-state image pick-up apparatus comprising:
a solid-state image pick-up device including:
a plurality of photosensitive cells two-dimensionally arranged for converting incident light from an object scene into signal charges;
a plurality of vertical transfer paths disposed adjacent each of said plurality of photosensitive cells and having electrodes vertically arranged for transferring the signal charges;
a plurality of gates formed between each of said plurality of photosensitive cells and associated one of said vertical transfer paths in connection with the electrodes of said one vertical transfer path for reading out the signal charges accumulated in said plurality of photosensitive cells to said vertical transfer path; and
a horizontal transfer path having electrodes for transferring the signal charges in a horizontal direction substantially perpendicular to said vertical transfer paths,
a timing signal generator for generating a timing signal to be supplied to said gates for reading out the signal charges accumulated in said photosensitive cells; and
a drive signal generator operative in response to the timing signal for generating a drive signal to be applied to the electrodes of said vertical transfer paths for transferring the signal charges,
said gates and the electrodes of said gates being alternately arranged on adjacent two of said vertical transfer paths,
said drive signal generator generating a drive signal for preventing the signal charges from staying under the electrodes in connection with said gates,
said apparatus further comprising a controller for controlling said drive signal generator based on an image pick-up condition obtained from the light incident,
wherein the drive signal has three levels, said drive signal generator generating the drive signal which changes to lowest one of the three levels prior to commencing horizontal transfer and which changes to middle one of the three levels after the horizontal transfer completed,
said controller performing control in accordance with a selected one of drive modes of relatively increasing a number of drive phases and a number of times the signal charges being read out in relation to an increase of the optical sensitivity set.

2. A solid-state image pick-up apparatus comprising:
a solid-state image pick-up device including:
a plurality of photosensitive cells two-dimensionally arranged for converting incident light from an object scene into signal charges;
a plurality of vertical transfer paths disposed adjacent each of said plurality of photosensitive cells and having electrodes vertically arranged for transferring the signal charges;
a plurality of gates formed between each of said plurality of photosensitive cells and associated one of said vertical transfer paths in connection with the electrodes of said one vertical transfer path for reading out the signal charges accumulated in said plurality of photosensitive cells to said vertical transfer path; and
a horizontal transfer path having electrodes for transferring the signal charges in a horizontal direction substantially perpendicular to said vertical transfer paths,
a timing signal generator for generating a timing signal to be supplied to said gates for reading out the signal charges accumulated in said photosensitive cells; and
a drive signal generator operative in response to the timing signal for generating a drive signal to be applied to the electrodes of said vertical transfer paths for transferring the signal charges,
said gates and the electrodes of said gates being alternately arranged on adjacent two of said vertical transfer paths,
said drive signal generator generating a drive signal for preventing the signal charges from staying under the electrodes in connection with said gates,
said apparatus further comprising a controller for controlling said drive signal generator based on an image pick-up condition obtained from the light incident,
wherein the drive signal has three levels, said drive signal generator generating the drive signal which changes to lowest one of the three levels prior to commencing horizontal transfer and which changes to middle one of the three levels after the horizontal transfer completed,
said apparatus further comprising a temperature sensor for measuring temperature inside said apparatus,
said controller performing control in accordance with a selected one of drive modes of relatively increasing a number of drive phases and a number of times the signal charges being read out in relation to an increase of the measured temperature.

3. The apparatus in accordance with claim 1, wherein the drive modes include a drive mode of reading out signal charges over a plurality of interlacing fields, said controller performing control in accordance with the drive mode with a number of interlacing fields selected.

4. The apparatus in accordance with claim 3, wherein the drive modes include a drive mode of reading out signal charges with a progressive scan, said the apparatus performing control in accordance with the progressive scan selected.

5. A drive method for use in a solid-state image pick-up apparatus including a plurality of photosensitive cells two-dimensionally arranged for converting incident light from an object scene into signal charges, the signal charges accumulated in each of the plurality of photosensitive cells being read out from the cell, sequentially transferred in a vertical direction and in a horizontal direction to be converted into an electric signal to be output, said method comprising:

a first step of controlling generation of a timing signal based on an image pick-up condition obtained from the incident light;

a second step of generating a timing signal for reading out the signal charges accumulated in the photosensitive cells; and a third step of generating a first drive signal for reading out the signal charges accumulated and a second drive signal for transferring the signal charges in a vertical direction, said third step generating, based on the image pick-up condition, a third drive signal for preventing the signal charges from waiting for transfer, wherein the third drive signal has three levels, the third drive signal changing, based on the image pick-up condition, one of drive signals having a phase different from each other for driving an electrode for reading out the signal charges to lowest one of the three levels prior to commencing horizontal transfer and to middle one of the three levels after the horizontal transfer completed, said first step performing control in accordance with a selected one of drive modes of relatively increasing a number of drive phases and a number of times the signal charges being read out in relation to an increase of the optical sensitivity set.

6. A drive method for use in a solid-state image pick-up apparatus including a plurality of photosensitive cells two-dimensionally arranged for converting incident light from an object scene into signal charges, the signal charges accumulated in each of the plurality of photosensitive cells being read out from the cell, sequentially transferred in a vertical direction and in a horizontal direction to be converted into an electric signal to be output, said method comprising:

a first step of controlling generation of a timing signal based on an image pick-up condition obtained from the incident light;

a second step of generating a timing signal for reading out the signal charges accumulated in the photosensitive cells; and a third step of generating a first drive signal for reading out the signal charges accumulated and a second drive signal for transferring the signal charges in a vertical direction, said third step generating, based on the image pick-up condition, a third drive signal for preventing the signal charges from waiting for transfer, wherein the third drive signal has three levels, the third drive signal changing, based on the image pick-up condition, one of drive signals having a phase different from each other for driving an electrode for reading out the signal charges to lowest one of the three levels prior to commencing horizontal transfer and to middle one of the three levels after the horizontal transfer completed, said method further comprising the step of, prior to said first step, measuring temperature by a temperature sensor installed, said first step performing control in accordance with selected one of drive modes of relatively increasing a number of drive phases and a number of times the signal charges being read out in relation to the temperature measured.

7. A drive method for use in a solid-state image pick-up apparatus including a plurality of photosensitive cells two-dimensionally arranged for converting incident light from an object scene into signal charges, the signal charges accumulated in each of the plurality of photosensitive cells being read out from the cell, sequentially transferred in a vertical direction and in a horizontal direction to be converted into an electric signal to be output, said method comprising:

a first step of controlling generation of a timing signal based on an image pick-up condition obtained from the incident light;

a second step of generating a timing signal for reading out the signal charges accumulated in the photosensitive cells; and a third step of generating a first drive signal for reading out the signal charges accumulated and a second drive signal for transferring the signal charges in a vertical direction, said third step generating, based on the image pick-up condition, a third drive signal for preventing the signal charges from waiting for transfer, wherein, when one of drive modes is selected which reads out signal charges over a plurality of interlacing fields, said first step performs control in accordance with the one drive mode with a number of interlacing fields selected.

8. The method in accordance with claim 7, wherein, when one of the drive modes is selected which reads out signal charges with a progressive scan, said first step performs control in accordance with the progressive scan selected.

* * * * *